(12) United States Patent
Kim et al.

(10) Patent No.: US 12,267,881 B2
(45) Date of Patent: Apr. 1, 2025

(54) FRAME TRANSMISSION METHOD AND DEVICE USING MULTIPLE RANDOM BACKOFF OPERATION IN BROADBAND WIRELESS COMMUNICATION NETWORK

(71) Applicants: Hyundai Motor Company, Seoul (KR); Kia Corporation, Seoul (KR); Korea National University of Transportation Industry—Academic Cooperation Foundation, Chungju-Si (KR)

(72) Inventors: Yong Ho Kim, Incheon (KR); Yong Su Gwak, Seoul (KR)

(73) Assignees: Hyundai Motor Company, Seoul (KR); Kia Corporation, Seoul (KR); Korea National University of Transportation Industry—Academic Cooperation Foundation, Chungcheongbuk-do (KR)

( * ) Notice: Subject to any disclaimer, the term of this patent is extended or adjusted under 35 U.S.C. 154(b) by 465 days.

(21) Appl. No.: 17/610,150

(22) PCT Filed: May 8, 2020

(86) PCT No.: PCT/KR2020/006127
§ 371 (c)(1),
(2) Date: Nov. 9, 2021

(87) PCT Pub. No.: WO2020/226462
PCT Pub. Date: Nov. 12, 2020

(65) Prior Publication Data
US 2022/0225406 A1    Jul. 14, 2022

(30) Foreign Application Priority Data

May 9, 2019   (KR) ........................ 10-2019-0054559

(51) Int. Cl.
H04W 74/0833    (2024.01)
H04L 1/1607    (2023.01)
(Continued)

(52) U.S. Cl.
CPC ......... H04W 74/085 (2013.01); H04L 1/1621 (2013.01); H04W 72/0446 (2013.01); H04W 74/0866 (2013.01)

(58) Field of Classification Search
None
See application file for complete search history.

(56) References Cited

U.S. PATENT DOCUMENTS

| | | | | |
|---|---|---|---|---|
| 8,923,118 B1* | 12/2014 | Liu | ...................... | H04W 24/02 |
| | | | | 370/252 |
| 2015/0029977 A1* | 1/2015 | Seok | ..................... | H04W 72/20 |
| | | | | 370/329 |

(Continued)

*Primary Examiner* — Clemence S Han
(74) *Attorney, Agent, or Firm* — Fox Rothschild LLP

(57) ABSTRACT

An operating method of a communication node in a wireless communication network includes: performing a first monitoring operation on a first link and a second link during a preset period; performing a first random backoff operation in the first link for a first random backoff period, if the first link and the second link are in an idle state according to the first monitoring operation; performing, in the second link, a second random backoff operation for a second random backoff period which is different from the first random backoff period in length; and transmitting a frame at a same point in time in the first link and the second link, if the first link is in the idle state according to the first random backoff operation, and if the state of the second link is an idle state according to execution of the second random backoff operation.

20 Claims, 31 Drawing Sheets

(51) Int. Cl.
*H04W 72/0446* (2023.01)
*H04W 74/08* (2009.01)

(56) References Cited

U.S. PATENT DOCUMENTS

| | | | | |
|---|---|---|---|---|
| 2015/0365972 A1* | 12/2015 | Seok | ................. | H04W 74/0891 |
| | | | | 370/336 |
| 2017/0034838 A1* | 2/2017 | Trainin | ............. | H04W 74/0808 |
| 2017/0290059 A1* | 10/2017 | Karaki | .................. | H04W 16/14 |
| 2018/0124611 A1* | 5/2018 | Moon | ............... | H04W 72/0453 |
| 2018/0220457 A1* | 8/2018 | Koorapaty | ............ | H04W 24/02 |
| 2018/0235002 A1* | 8/2018 | Son | ........................ | H04W 74/00 |
| 2018/0310340 A1* | 10/2018 | Noh | .................. | H04W 74/0825 |
| 2018/0317264 A1* | 11/2018 | Agiwal | ................ | H04W 52/36 |
| 2019/0045508 A1* | 2/2019 | Cariou | .............. | H04W 72/0446 |
| 2019/0069324 A1* | 2/2019 | Ansari | ................. | H04W 16/14 |
| 2023/0300880 A1* | 9/2023 | Ahn | ..................... | H04W 74/08 |
| | | | | 370/336 |
| 2023/0422026 A1* | 12/2023 | Jang | ....................... | H04L 45/22 |

\* cited by examiner

FRAME TRANSMISSION METHOD AND DEVICE USING MULTIPLE RANDOM BACKOFF OPERATION IN BROADBAND WIRELESS COMMUNICATION NETWORK

CROSS-REFERENCE TO RELATED APPLICATIONS

This application is a National Phase application filed under 35 USC 371 of PCT International Application No. PCT/KR2020/006127 with an International Filing Date of May 8, 2020, which claims priority from Korean Application 10-2019-0054559 filed on May 9, 2019. The entire contents of these applications are incorporated herein by reference in their entirety.

BACKGROUND

(a) Technical Field

The present disclosure relates to a communication method in a broadband wireless communication network, more particularly, to a method, an apparatus, and a system for frame transmission through a random backoff operation according to characteristics of a frame payload.

(b) Description of the Related Art

Recently, with the spread of mobile devices, wireless LAN technology that can provide fast wireless Internet services to the mobile devices has been in the spotlight. The standards for the wireless LAN technology are being developed mainly as the IEEE 802.11 standards by the Institute of Electrical and Electronics Engineers (IEEE). The IEEE 802.11 standards were developed and standardized in such a way that, starting with the initial version supporting 1 to 2 Mbps, they were revised through subsequent versions.

Standardized technologies for specific operations such as fast handoff (i.e., fast BSS transition), fast initial link setup, technology for low-power terminals operating in a band of 1 GHz or below, wireless LAN technology for vehicle terminals, and the like were developed, and reflected in the respective standard revisions. In particular, the wireless LAN technology for vehicle terminals is reflected in the IEEE 802.11p, which is based on a signal form in the IEEE 802.11a and an enhanced distributed channel access (EDCA) in the IEEE 802.11e, and operates in a band of 5.9 GHz. Further, it is based on a 10 MHz bandwidth to be suitable for a terminal having high mobility, and supports 'outside context of BSS (OCB)' communication so that the terminal can directly perform inter-vehicle communications without going through authentication and association procedures with a wireless access point.

Meanwhile, as more sensors and operations are developed for vehicle communication operations, applications for the corresponding operations are diversified, and in order to achieve a higher data throughput and improve a transmission distance compared to the IEEE 802.11p, the IEEE 802.11bd is being developed and standardized to establish a wireless LAN standard for next-generation vehicle communication (i.e., next generation V2X (NGV)).

Recently, as applications requiring a higher throughput and applications requiring real-time transmission occur, an Extreme High Throughput (EHT) wireless LAN technology has been proposed and is under development.

SUMMARY

The present disclosure is directed to solving a capacity problem of a 10 MHz channel, and provides methods for performing a multi-random backoff operation according to an access class (AC) of enhanced distributed channel access (EDCA), in which a 20 MHz channel is used by extending the 10 MHz channel to the 20 MHz channel in consideration of fairness with an adjacent 10 MHz channel when the adjacent 10 MHz channel is available.

The present disclosure provides methods for transmitting frames through one or more links by configuring a multi-link association and performing a random backoff operation on each of a plurality of links.

An operation method of a communication node in a wireless communication network, according to an exemplary embodiment of the present disclosure, may comprise: performing a first monitoring operation on a first link and a second link during a preset period; in response to determining that the first link and the second link are in idle states as a result of the first monitoring operation, performing a first random backoff operation on the first link during a first random backoff period; performing a second random backoff operation on the second link during a second random backoff period; and in response to determining that the first link is in idle state as a result of the first random backoff operation and determining that the second link is in idle state as a result of the second random backoff operation, transmitting a frame through the first link and the second link at a same time.

The first link may be a primary link having a 10 MHz bandwidth for transmitting the frame, and the second link may be a secondary link having a 10 MHz bandwidth for extending the first link.

The frame may include a 20 MHz physical layer convergence procedure (PLCP) protocol data unit (PPDU).

The preset period may be an arbitration interframe space (AIFS).

The operation method may further comprise, when the first random backoff operation on the first link is completed, delaying the transmission of the frame through the first link until completion of the second random backoff operation.

In the delaying of the transmission of the frame through the first link until completion of the second random backoff operation, the transmission of the frame may be delayed when a difference between the first random backoff period and the second random backoff period is less than or equal to a preset value.

The performing of the first random backoff operation on the first link further may comprise: detecting a busy state of the first link by another communication node; and performing a second monitoring operation on the first link during a preset point coordination function (PIFS) period when the busy state of the first link ends, wherein the frame is transmitted through the first link and the second link, in response to determining that the first link is in idle state as a result of the second monitoring operation, and determining that the second link is in idle state as a result of performing the second random backoff operation.

An operation method of a first communication node in a wireless communication network, according to another exemplary embodiment of the present disclosure, may comprise: establishing a plurality of links including a first link and a second link with a second communication node; performing a first random backoff operation on the first link during a first period; transmitting a sharing frame requesting occupation of the first link to the second communication node through the first link, after completion of the first random backoff operation; delaying transmission of a frame during a busy period of the first link occupied by the second communication node receiving the sharing frame; performing a second random backoff operation on the second link during a second period having a different length as the first period; and in response to determining that the first link and the second link are in idle states, transmitting the frame through the first link and the second link at a same time.

The operation method may further comprise, after transmitting the sharing frame to the second communication node, receiving an acknowledgement (ACK) for the sharing frame from the second communication node through the first link.

The ACK for the sharing frame may include information on whether the second link is busy at a time of transmitting the sharing frame.

The operation method may further comprise, after receiving the ACK for the sharing frame, receiving a downlink frame from the second communication node through the first link after a preset time period elapses from a time of receiving the ACK for the sharing frame.

The preset time period may be one of a point coordination function interframe space (PIFS) or a short IFS (SIFS).

The operation method may further comprise, after the second random backoff operation on the second link is completed, receiving, from the second communication node, a trigger frame indicating transmission of the frame, through the first link and the second link.

The operation method may further comprise, after transmitting the frame, receiving a block ACK (BA) for the frame from the second communication node through the first link and the second link.

A first communication node in a wireless communication network, according to yet another exemplary embodiment of the present disclosure, may comprise a processor; a memory storing at least one instruction executable by the processor; and transmit antennas for transmitting signals generated by the processor, wherein the at least one instruction is executed to: establish a plurality of links including a first link and a second link with a second communication node; establish a plurality of links including a first link and a second link with a second communication node; perform a first monitoring operation on the first link and the second link during a preset period; in response to determining that the first link and the second link are in idle states as a result of the first monitoring operation, perform a first random backoff operation on the first link during a first random backoff period; perform a second random backoff operation on the second link during a second random backoff period; and in response to determining that the first link is in idle state as a result of the first random backoff operation and determining that the second link is in idle state as a result of the second random backoff operation, transmit a frame through the first link and the second link at a same time.

The first link may be a primary link having a 10 MHz bandwidth for transmitting the frame, the second link may be a secondary link having a 10 MHz bandwidth for extending the first link, and the frame may include a 20 MHz physical layer convergence procedure (PLCP) protocol data unit (PPDU).

The at least one instruction may be further executed to: after performing the first random backoff operation on the first link, delay the transmission of the frame through the first link until completion of the second random backoff operation when a difference between the first random backoff period and the second random backoff period is less than or equal to a preset value.

The at least one instruction may be further executed to: after performing the first random backoff operation, transmit a sharing frame requesting occupation of the first link to the second communication node through the first link; receive an acknowledgement (ACK) for the sharing frame from the second communication node; and delay transmission of the frame during a busy period of the first link occupied by the second communication node receiving the sharing frame.

The at least one instruction may be further executed to: after performing the second random backoff operation on the second link, receive, from the second communication node, a trigger frame indicating transmission of the frame, through the first link and the second link.

The at least one instruction may be further executed to: after transmitting the frame, receive a block ACK (BA) for the frame from the second communication node through the first link and the second link.

According to the present disclosure, a communication node may perform a random backoff operation on each of configured multi-links during a different period. Based on results of the random backoff operations, the communication node may transmit physical layer convergence procedure (PLCP) protocol data units (PPDUs) the through a plurality of links.

According to the present disclosure, by dynamically extending a channel or link according to a payload type and performing transmission, a communication node transmitting a real-time PPDU may transmit a frame after a small transmission delay, and a communication node transmitting a non-real-time PPDU may transmit the PPDU through a 20 MHz channel whenever possible.

The present disclosure may be used in various communication devices such as a communication node for a vehicle, a wireless access point, and an access management device, and a station or base station using cellular communication.

DETAILED DESCRIPTION

Figure 1:
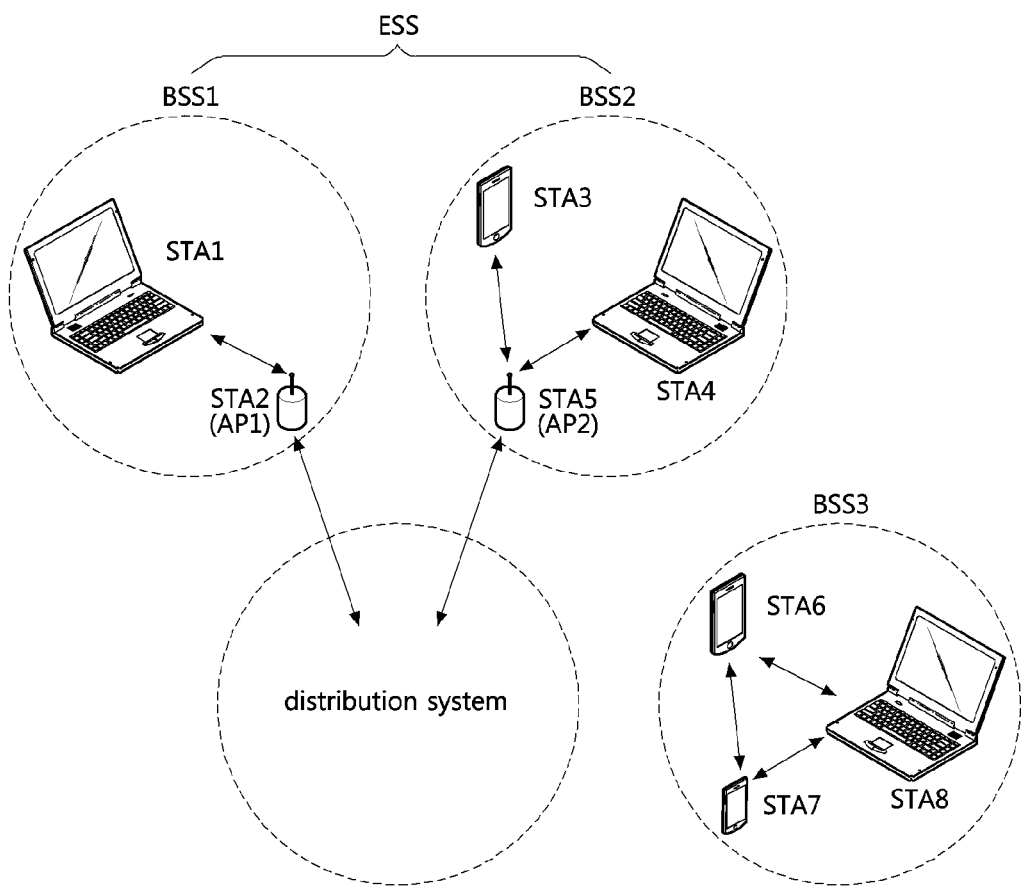
FIG. 1 is a diagram illustrating a first exemplary embodiment of a wireless LAN system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

FIG. 1 is a diagram illustrating a first exemplary embodiment of a wireless LAN system.

As shown in FIG. 1, a wireless LAN system may include at least one basic service set (BSS). The BSS denotes a set of stations (STAs) (e.g., STA1, STA2 (i.e., AP1), STA3, STA4, and STA5 (i.e., AP2), STA6, STA7, and STA8) configured to communicate with each other through successful synchronization. The BSS does not necessarily denote a specific area. In exemplary embodiments below, a station that performs a function of an access point may be referred to as an "access point (AP)", and a station that does not perform the function of an access point may be referred to as a "non-AP station" or "station".

The BSSs may be classified into infrastructure BSSs and independent BSSs (IBSSs). In particular, a BSS1 and a BSS2 may be infrastructure BSSs, and a BSS3 may be an IBSS. The BSS1 may include a first station STA1, a first access point STA2 (AP1) providing a distribution service, and a distribution system (DS) connecting a plurality of access points (i.e., STA2 (AP1), STA5 (AP2)). In the BSS1, the first AP (STA2 (AP1)) may manage the first station STA1.

The BSS2 may include a third station STA3, a fourth station (STA4), a second access point (STA5 (AP2)) providing a distribution service, and a distribution system (DS) connecting a plurality of access points (i.e., STA2 (AP1), STA5 (AP2)). In the BSS2, the second AP (STA5 (AP2)) may manage the third station STA3 and the fourth station STA4.

The BSS3 may be an IBSS operating in an ad-hoc mode. In the BSS3, there is not an AP that is a centralized management entity performing management functions at a center. In other words, in the BSS3, the stations STA6, STA7, and STA8 may be managed in a distributed manner. In the BSS3, all the stations STA6, STA7, and STA8 may be mobile stations and may be not permitted to connect to the DS, thus forming a self-contained network.

The access points (STA2 (AP1), STA5 (AP2)) may provide access to the DS via a wireless medium for the stations STA1, STA3, and STA4 associated therewith. In the BSS1 or BSS2, communication between the stations STA1, STA3, and STA4 may be generally performed through the access points (STA2 (AP1), STA5 (AP2)), but when direct links are established, direct communication between the stations STA1, STA3, and STA4 may be possible.

A plurality of infrastructure BSSs may be interconnected via a DS. A plurality of BSSs connected via a DS is referred to as an extended service set (ESS). The stations (e.g., STA1, STA2 (i.e., AP1), STA3, STA4, and STA5 (i.e., AP2)) included in an ESS may be configured to communicate with each other, and a station (e.g., STA1, STA3, or STA4) in the ESS may move from one BSS to another BSS while performing seamless communication.

The DS is a mechanism for one access point to communicate with another access point. Using the DS, the access point may transmit frames for stations associated with a BSS it manages, or may transmit frames to stations having moved to another BSS. In addition, the access point may transmit and receive frames to and from an external network such as a wired network. Such the DS may not necessarily have to be a network, and if it can provide a predetermined distribution service specified in the IEEE 802.11 standard, there is no restriction on its form. For example, the DS may be a wireless network such as a mesh network or a physical structure that connects access points to each other.

Stations (i.e., communication nodes) of a wireless LAN vehicle-to-everything (V2X) network may not perform operations of configuring a BSS by synchronizing with an access point. The stations (i.e., communication nodes) of the wireless LAN vehicle communication network may perform 'Outside the Context of BSS (OCB)' communication for direct communication between the station(s). Each of the stations performing OCB communication may transmit a frame to other station(s) while omitting a procedure for synchronization with the access point.

Each of the communication nodes (e.g., STA1, STA2 (AP1), STA3, STA4, STA5 (AP2), STA6, STA7, and STA8) included in the wireless LAN system may be configured as follows.

Figure 2:
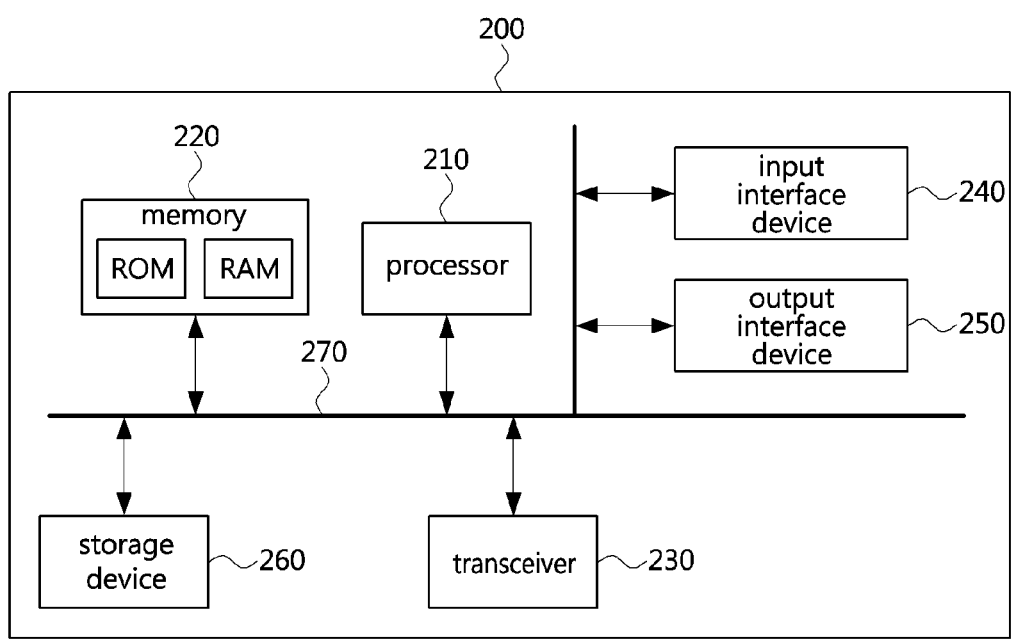
FIG. 2 is a block diagram illustrating a first exemplary embodiment of a communication node configured as a wireless LAN system.

FIG. 2 is a block diagram illustrating a first exemplary embodiment of a communication node configured as a wireless LAN system.

As shown in FIG. 2, a communication node 200 may include at least one processor 210, a memory 220, and a transceiver 230 connected to a network for performing communications. The transceiver 230 may also be referred to as a "radio frequency (RF) unit", "RF module", or the like. Additionally, the communication node 200 may further include an input interface device 240, an output interface device 250, a storage device 260, and the like. Each component included in the communication node 200 may be configured to communicate with each other as connected via a common bus 270.

However, each of the components included in the communication node 200 may be connected to the processor 210 via a separate interface or a separate bus rather than the common bus 270. For example, the processor 210 may be connected to at least one of the memory 220, the transceiver 230, the input interface device 240, the output interface device 250, and the storage device 260 via a dedicated interface.

The processor 210 may be configured to execute at least one instruction stored in at least one of the memory 220 and the storage device 260. The processor 210 may refer to a central processing unit (CPU), a graphics processing unit (GPU), or a dedicated processor. Methods in accordance with exemplary embodiments of the present disclosure may be performed by the processor 210. Each of the memory 220 and the storage device 260 may include at least one of a volatile storage medium and a non-volatile storage medium. For example, the memory 220 may include at least one of read-only memory (ROM) and random access memory (RAM).

Meanwhile, in the wireless LAN system, an association procedure may be performed as follows.

Figure 3:
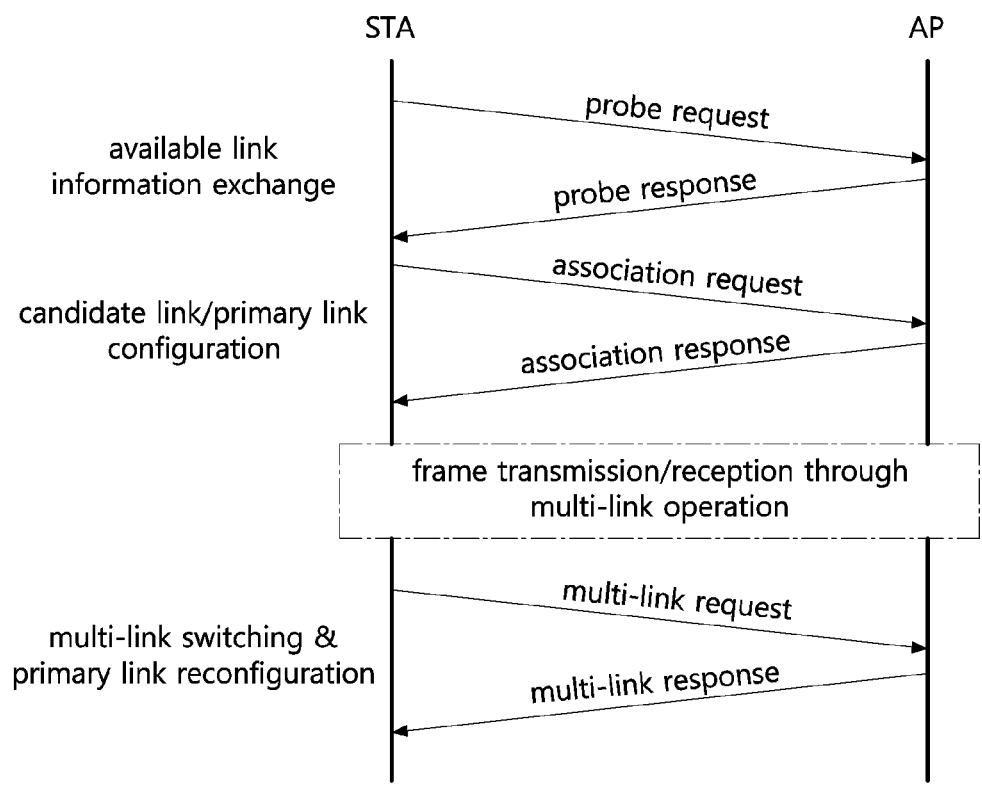
FIG. 3 is a sequence chart illustrating an association procedure of a station in a wireless LAN system.

FIG. 3 is a sequence chart illustrating an association procedure of a station in a wireless LAN system.

As shown in FIG. 3, an association procedure of a station STA in an infrastructure BSS may generally be divided into a probe step of probing an AP, an authentication step for authentication with the probed AP, and an association step of associating with the authenticated AP.

The STA may discover neighboring APs. The STA may transmit a probe request frame, and may detect neighboring APs by receiving probe response frames that are responses to the probe request frame from the neighboring APs. The STA may exchange information on whether a multi-link association is possible and information on available links with the AP.

The STA may perform the association step with the AP. That is, the STA may transmit an association request frame to the selected AP, and may complete association with the selected AP by receiving, from the selected AP, an association response frame that is a response to the association request frame.

The STA may perform a negotiation procedure for multi-link association with the AP in the association step with the AP. The AP may allocate information of available links of the AP and an identifier (ID) to each of the links and, and may transmit information on whether each of the links is activated or not by using the ID in the negotiation and change procedure for multi-link operation.

The STA may exchange information on availability of the multi-link operation by exchanging capability elements (e.g., EHT capability elements) with the AP. The capability elements may include a supported band, information of supported links, the number of supported links, information on a band interval between bands for a communication node (e.g., STA and AP) to support simultaneous transmission/reception operations, and the like.

The STA having performed the association step with the AP may configure a multi-link association with the AP. That is, the STA may transmit a multi-link request frame to the AP, and may complete configuration of the multi-link association with the selected AP by receiving, from the selected AP, a multi-link response frame that is a response to the multi-link request frame.

In the case of wireless LAN V2X communication, the stations (i.e., communication nodes) may not need to perform operations of configuring a BSS by synchronizing with an AP, and may perform OCB communication for direct communication between the station(s). Each of the stations performing OCB communication may transmit a frame to other station(s) while omitting a beacon reception procedure for discovering an AP and synchronizing with the AP, probe request/response procedure, association request/response procedure, authentication procedure, and the like.

Meanwhile, a communication node (e.g., access point, station, etc.) belonging to the WIRELESS LAN system may be configured to perform transmission and reception of a frame based on a point coordination function (PCF), a hybrid coordination function (HCF), an HCF controlled channel access (HCCA), a distributed coordination function (DCF), and/or an enhanced distributed channel access (EDCA).

The frame in the WIRELESS LAN system may be classified into a management frame, a control frame, and a data frame. The management frame may be classified into an association request frame, an association response frame, a reassociation request frame, a reassociation response frame, a probe request frame, a probe response frame, a beacon frame, and an association. Additionally, the management frame may include a disassociation frame, an authentication frame, a deauthentication frame, an action frame, and the like.

The control frame may be classified into an acknowledgment (ACK) frame, a block ACK request (BAR) frame, a block ACK (BA) frame, a power saving (PS)-Poll frame, a request-to-send (RTS) frame, a clear-to-send (CTS) frame, and the like. The data frame may be classified into a quality of service (QoS) data frame and a non-QoS data frame. The QoS data frame may refer to a data frame for transmission based on the QoS, and the non-QoS data frame may refer to a data frame for transmission not based on the QoS.

Meanwhile, in the wireless LAN system, a communication node (e.g., access point or station) may be configured to operate based on the EDCA.

Figure 4:
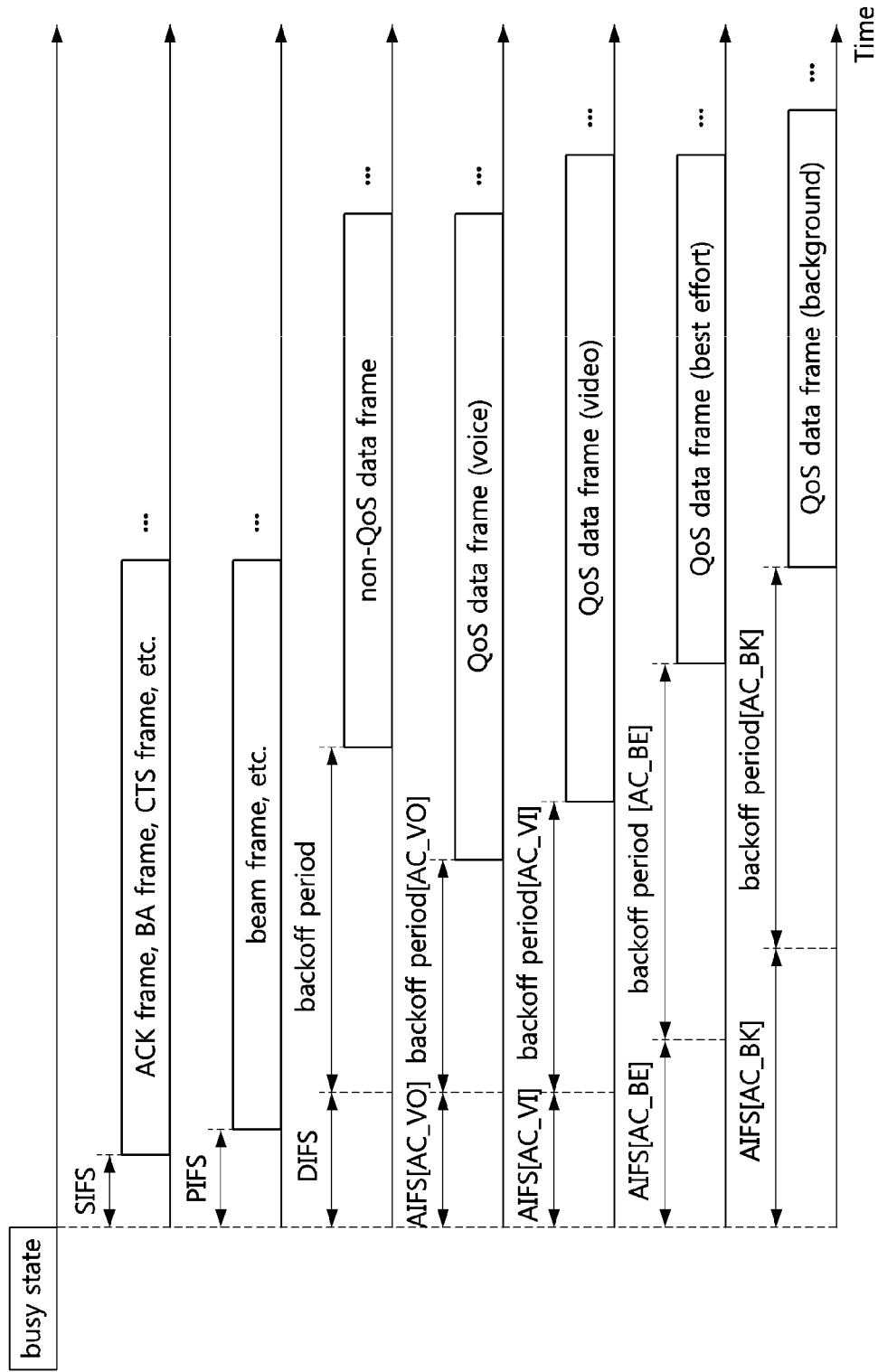
FIG. 4 is a timing diagram illustrating a first exemplary embodiment of an operation method of a communication node based on an EDCA.

FIG. 4 is a timing diagram illustrating a first exemplary embodiment of an operation method of a communication node based on an EDCA.

As shown in FIG. 4, a communication node intending to transmit a control frame (or management frame) may be configured to perform a monitoring operation (e.g., carrier sensing operation) on a channel state during a predetermined period (e.g., short interframe space (SIFS) or PCF IFS (PIFS)). When the channel state is determined to be idle during the predetermined period (e.g., SIFS or PIFS), the communication node may be configured to transmit a control frame (or management frame). For example, the communication node may be configured to transmit an ACK frame, a BA frame, a CTS frame, or the like when the channel state is determined to be idle during an SIFS. Additionally, the communication node may be configured to transmit a beacon frame or the like when the channel state is determined to be idle during a PIFS. When the channel state is determined to be busy during the predetermined period (e.g., SIFS or PIFS), the communication node may be configured not to transmit a control frame (or management frame). In particular, the carrier sensing operation may be referred to as a clear channel assessment (CCA) operation.

A communication node intending to transmit a non-QoS data frame may be configured to perform a monitoring operation (e.g., carrier sensing operation) on a channel state during a DCF IFS (DIFS). When the channel state is determined to be idle during a DIFS, the communication node may be configured to perform a random backoff procedure. For example, the communication node may be configured to select a backoff value (e.g., backoff counter) within a contention window based on the random backoff procedure, and perform the monitoring operation (e.g., carrier sensing operation) during a period corresponding to the selected backoff value. The communication node may be configured to transmit a non-QoS data frame when the channel state is determined to be idle during the backoff period.

A communication node intending to transmit a QoS data frame may be configured to perform a monitoring operation (e.g., carrier sensing operation) on a channel state during an arbitration IFS (AIFS). When the channel state is determined to be idle during an AIFS, the communication node may be configured to perform a random backoff procedure. The AIFS may be set based on an access category (AC) of a data unit (e.g., protocol data unit (PDU)) included in the QoS data frame. The AC of the data unit may be as shown in Table 1 below.

TABLE 1

| Priority | AC | Description |
| --- | --- | --- |
| Lowest | AC_BK | Background |
| . | AC_BE | Best effort |
| . | AC_VI | Video |
| . | AC_VO | Voice |
| Highest | | |

AC_BK may indicate background data, AC_BE may indicate data transmitted in a best effort manner, AC_VI may indicate video data, and AC_VO may indicate voice data. For example, the length of the AIFS for the QoS data frame of each of AC_VO and AC_VI may be set equal to the length of the DIFS. The length of the AIFS for the QoS data frame of AC_BE and AC_BK may be set longer than the length of the DIFS. The length of the AIFS for the QoS data frame of AC_BK may be set longer than the length of the AIFS for the QoS data frame of AC_BE.

In the random backoff procedure, the communication node may be configured to select a backoff value (e.g., backoff counter) within a contention window based on the AC of the QoS data frame. The contention window based on the AC may be as shown in Table 2 below. As shown below, $CW_{min}$ may indicate the minimum value of the contention window, $CW_{max}$ may indicate the maximum value of the contention window, and each of the minimum and maximum values of the contention window may be expressed by the number of slots.

TABLE 2

| AC | $CW_{min}$ | $CW_{max}$ |
| --- | --- | --- |
| AC_BK | 31 | 1023 |
| AC_BE | 31 | 1023 |
| AC_VI | 15 | 31 |
| AC_VO | 7 | 15 |

The communication node may be configured to perform a monitoring operation (e.g., carrier sensing operation) on the channel state during a backoff period, and transmit the QoS data frame when the channel state is determined to be idle during the backoff period.

Hereinafter, wireless LAN multi-channel operation methods in a communication system will be described. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. In other words, when an operation of a non-AP station is described, the corresponding AP may be configured to perform an operation that corresponds to the operation of the non-AP station. Conversely, when an operation of the AP is described, the corresponding non-AP station may be configured to perform an operation that corresponds to the operation of the AP.

Figure 5:
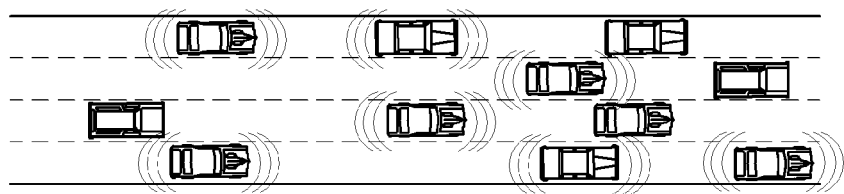
FIG. 5 is a conceptual diagram illustrating an exemplary embodiment of a communication network including communication nodes performing vehicle-to-vehicle communication.

FIG. 5 is a conceptual diagram illustrating an exemplary embodiment of a communication network including communication nodes performing vehicle-to-vehicle communication.

As shown in FIG. 5, when a vehicle communication node including a communication device detects a specific situation through a sensor or performs a specific operation, the vehicle communication node may transmit and receive data including a position, speed, acceleration, and measurement result of the sensor of a vehicle in form of a broadcast frame. In addition, the vehicle communication node may receive a map of the surrounding situation and information on a specific event (e.g., accident and congestion information in the direction of road travel, etc.) from a roadside device such as a street light, traffic light, or the like on the road. The communication node in the vehicle communication network environment may not perform scanning, authentication, and association operations performed in the conventional WIRELESS LAN operation, and may transmit and receive OCB data without belonging to a specific BSS. Accordingly, a periodic beacon frame transmission operation or the like from a wireless access point may not be performed.

Figure 6:
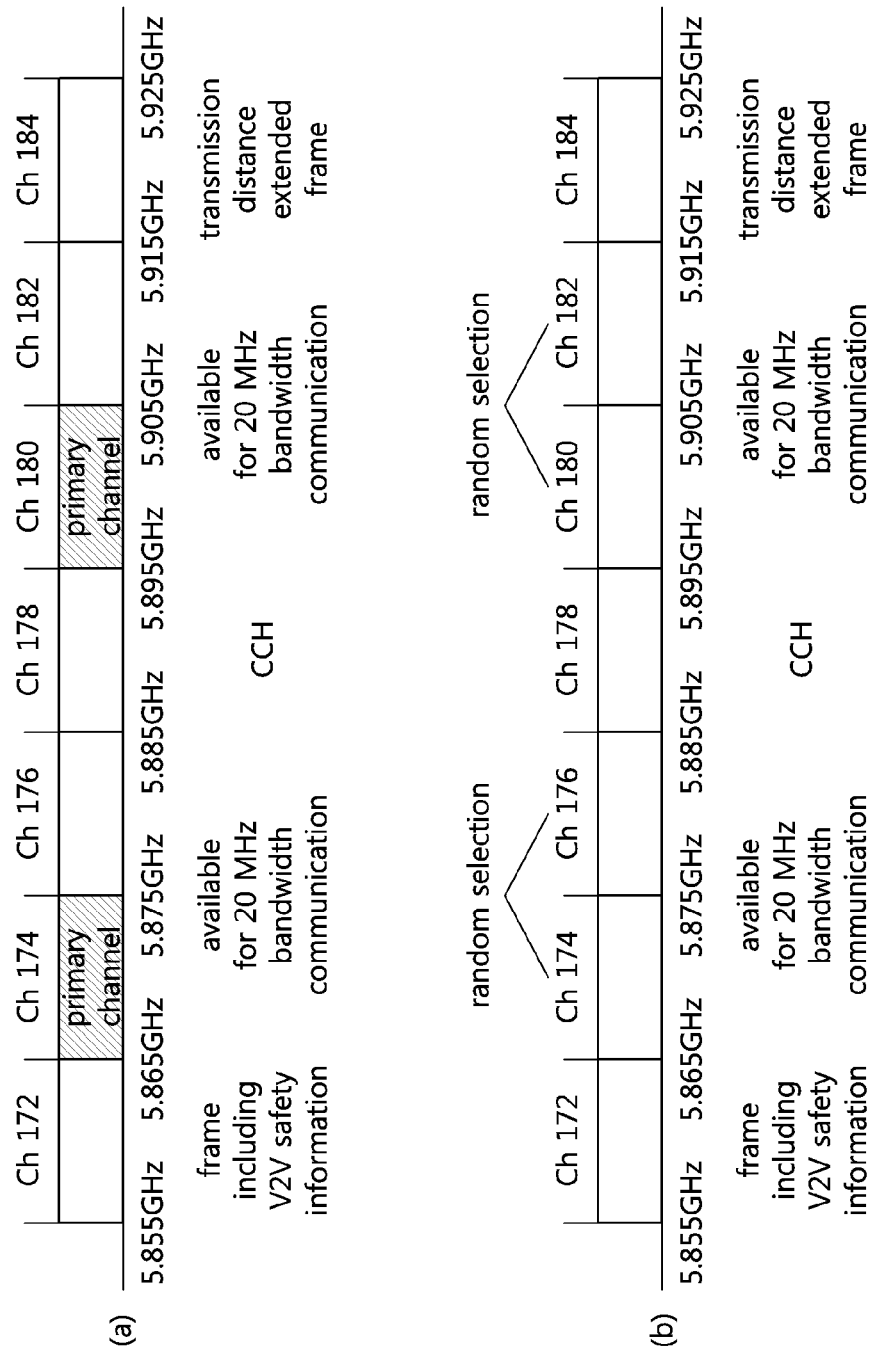
FIG. 6 is a conceptual diagram illustrating a first exemplary embodiment of a method for allocating a channel and defining a primary channel for a communication node performing vehicle-to-vehicle communication.

FIG. 6 is a conceptual diagram illustrating a first exemplary embodiment of a method for allocating a channel and defining a primary channel for a communication node performing vehicle-to-vehicle communication.

As shown in (a) of FIG. 6, in case of the United States, a channel of a 5.9 GHz band for vehicle communication is defined as a band of 5.850 GHz to 5.925 GHz band, of which a channel 178 (5.885 GHz to 5.895 GHz) may be used for a control channel for transmitting control information or broadcasting use of another channel. Among the channels, a channel 172 may be a channel only for transmission of a safety message between vehicle communication nodes, and a channel 184 may be a channel allocated to extend a transmission distance of a frame. Accordingly, channels that can be used for 20 MHz bandwidth transmission may belong to a band of 5.865 GHz to 5.885 GHz or a band of 5.895 GHz to 5.915 GHz.

In order to transmit data at a high data rate using a 20 MHz bandwidth, as utilized in the existing WIRELESS LAN standard (IEEE 802.11n or IEEE 802.11ac), the communication node may transmit a frame by extending a bandwidth based on a primary channel. When the communication node extends a bandwidth based on the primary channel, the communication node may preconfigure the primary channel.

According to an exemplary embodiment, a communication node may fixedly configure a part of a band used for 20 MHz bandwidth communication as a primary channel. For example, if the communication node uses a band of 5.865 GHz to 5.885 GHz to transmit a signal having 20 MHz bandwidth, the communication node may fix a channel 174 (i.e., 5.865 GHz-5.875 GHz) as the primary channel to perform control channel access and frame transmission operations. When all vehicle communication nodes use the same primary channel, the communication node may basically recognize one channel (e.g., channel 174) among radio resources of 20 MHz bandwidth as the primary channel, and may sense the primary channel. In addition, the communication node performing the channel access operation may decode a frame by detecting the frame received through the 20 MHz channel as a result of sensing the primary channel or by detecting the frame received through the primary channel.

When intending to transmit a 20 MHz bandwidth signal by changing the primary channel of the corresponding band, the communication node may broadcast information on whether the primary channel is changed to the other communication nodes by a method utilizing a protocol in the upper layer (e.g., the method of indicating a primary channel together when a CCH indicates a channel to be used in a next period as in the existing IEEE 1609.4).

Figure 7:
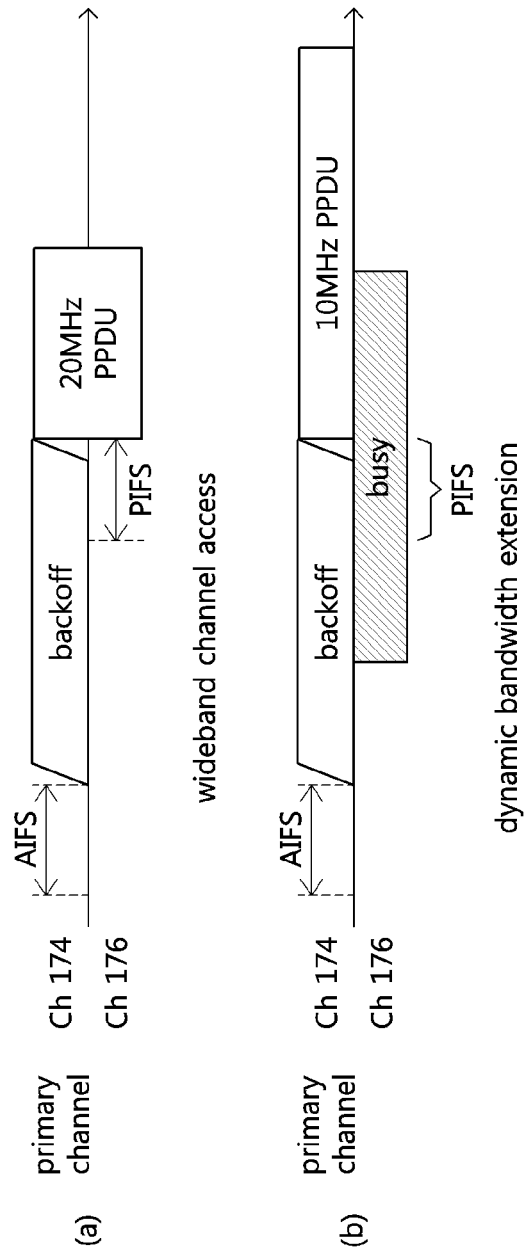
FIG. 7 is a conceptual diagram illustrating an exemplary embodiment of frame transmission through at least one channel of a 20 MHz channel extended based on a primary channel.

As shown in (b) of FIG. 6, in order to minimize the disadvantage that a communication node of one channel continuously suffers losses due to the fixed primary channel configuration as in (a) of FIG. 7, the communication node may not fixedly designate one primary channel, and may configure the primary channel randomly. The communication node may randomly configure one primary channel whenever channel access is performed by extending a bandwidth to 20 MHz, and may transmit a frame through the configured primary channel. Alternatively, the communication node may change configuration of the primary channel whenever performing channel access for transmitting a 20 MHz bandwidth signal. For example, when transmitting a frame through channels 174 and 176, the communication node may configure the channel 174 as the primary channel when transmitting the first frame, and may configure the channel 176 as the primary channel when transmitting the next frame. Even when the communication node transmits frames through the channels 180 and 182, the communication node may change the channel configuration by applying the same scheme. When communication nodes configure the primary channels randomly or alternately, the communication node receiving the frame from other communication nodes cannot identify the primary channel among the two channels in advance, so that the communication node may sense each 10 MHz channel constituting the 20 MHz bandwidth channel.

FIG. 7 is a conceptual diagram illustrating an exemplary embodiment of frame transmission through at least one channel of a 20 MHz channel extended based on a primary channel.

As shown in FIG. 7, a communication node may transmit a frame through a radio resource having a bandwidth extended to 20 MHz. The radio resource having a bandwidth extended to 20 MHz may include two channels (e.g., channel 174 and channel 176), and each of the two channels for frame transmission may include a primary channel and a secondary channel adjacent to the primary channel. For example, the primary channel among the two channels for frame transmission may be the channel 174, and the secondary channel may be the channel 176. In order to transmit a frame through the radio resource having a 20 MHz bandwidth, the communication node may perform access to the primary channel.

The communication node may perform a random backoff operation for channel access to the primary channel, and may perform a channel monitoring operation on the secondary channel during a preset time period. The length of the preset time period may be a PIFS, and the ending time of the PIFS may be the same as the time of completing the random backoff operation on the primary channel. According to the exemplary embodiment of (a) of FIG. 7, if the shorter backoff operation period in the primary channel ends and the secondary channel is in the idle state during the PIFS time period as a result of the channel monitoring on the secondary channel, the communication node may immediately transmit a frame through the primary channel and the secondary channel. On the other hand, according to the exemplary embodiment of (b) of FIG. 7, if the secondary channel is in the busy state during the PIFS time period as a result of the channel monitoring on the secondary channel, the communication node may not transmit a frame through the secondary channel, and may transmit the frame only through the primary channel. The communication node may transmit a frame to be transmitted through a 20 MHz channel only through the primary channel that is a 10 MHz channel, and such the frame transmission operation through the 10 MHz channel may be referred to as 'fallback transmission'.

Figure 8:
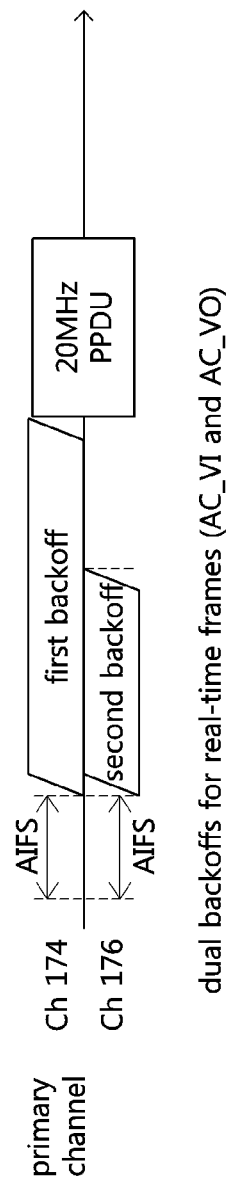
FIG. 8 is a conceptual diagram illustrating a first exemplary embodiment of a frame transmission operation through a 20 MHz channel as a result of channel monitoring and random backoff operation on a primary channel and a secondary channel.

FIG. 8 is a conceptual diagram illustrating a first exemplary embodiment of a frame transmission operation through a 20 MHz channel as a result of channel monitoring and random backoff operation on a primary channel and a secondary channel.

As shown in FIG. 8, a communication node may transmit a frame through two channels (e.g., channel 174 and channel 176). One channel (e.g., channel 174) of the two channels for frame transmission may be a primary channel, and the other channel (e.g., channel 176) may be a secondary channel for extension of the primary channel.

The communication node may monitor the channels (e.g., primary channel and/or secondary channel) before transmitting a real-time frame (e.g., frame including a video and/or voice payload, etc.). According to the exemplary embodiment of FIG. 8, the communication node may identify whether the channels are busy by monitoring the channels (e.g., primary channel and/or secondary channel) during a preset AIFS time period. According to the exemplary embodiment of FIG. 8, the communication node may determine whether the channels (e.g., primary channel and secondary channel) are busy during the preset AIFS time period.

As a result of the channel monitoring, if the channels (e.g., primary channel and secondary channel) are not busy during the preset AIFS time period, the communication node may perform random backoff operations on the channels. The communication node may independently perform the random backoff operation on each of the channels. That is, the communication node may perform the random backoff operation on the primary channel during a first period, and may perform the random backoff operation on the secondary channel during a second period. The first period may be a period having a length different from that of the second period. In order to determine the first period and the second period, the communication node may select random backoff counter values according to a rule set for each access category (AC) according to a type of a frame to be transmitted when performing the random backoffs. The communication node may randomly select two random backoff counters to be applied respectively to the first period and the second period at the same time. In a specific exemplary embodiment, the first and second periods may be AC_VO or AC_VI of FIG. 4. When the communication node completes the random backoff operations on the channels (e.g., primary channel and secondary channel), the communication node may transmit a 20 MHz PPDU frame through the primary channel and the secondary channel. That is, the communication node may transmit the frame through all available channels. The 20 MHz PPDU may be a plurality of PPDUs each of which is independent for each 10 MHz channel. The communication node may terminate the PPDU transmission through all channels at the same time. Therefore, if data bits of a PPDU are too small to end the transmissions of the PPDUs at the same time, the communication node may add padding bits to the PPDU to match the ending times of the PPDUs, thereby ending the transmissions of the PPDUs at the same time.

Figure 9:
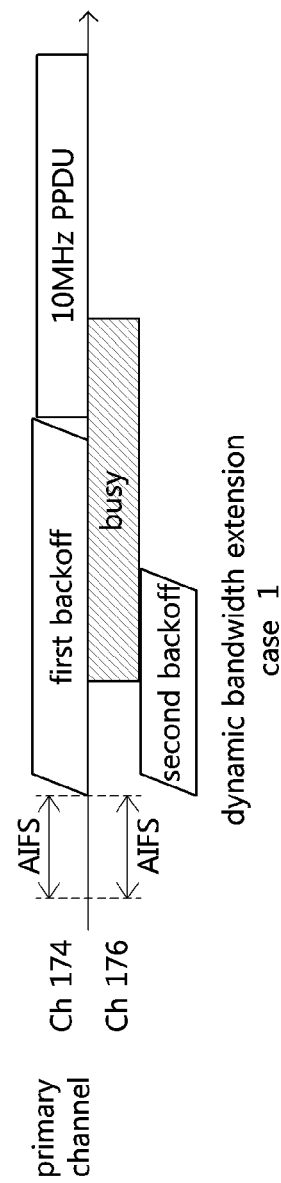
FIG. 9 is a conceptual diagram illustrating a first exemplary embodiment of a frame transmission operation through dynamic channel extension as a result of channel monitoring and random backoff operation on a primary channel and a secondary channel.

FIG. 9 is a conceptual diagram illustrating a first exemplary embodiment of a frame transmission operation through a 20 MHz band channel as a result of channel monitoring and random backoff operation on a primary channel and a secondary channel.

As shown in FIG. 9, a communication node may transmit a frame through two channels (e.g., channel 174 and channel 176). One channel (e.g., channel 174) of the two channels for frame transmission may be a primary channel, and the other channel (e.g., channel 176) may be a secondary channel for extension of the primary channel.

The communication node may monitor the channels (e.g., primary channel and/or secondary channel) before transmitting a real-time frame (e.g., frame including a video and/or voice payload, etc.). According to the exemplary embodiment of FIG. 9, the communication node may identify whether the channels are busy by monitoring the channels (e.g., primary channel and/or secondary channel) during a preset AIFS time period.

As a result of the channel monitoring, if the channels (e.g., primary channel and secondary channel) are not busy during the preset AIFS time period, the communication node may perform random backoff operations on the channels. The communication node may independently perform the random backoff operation on each of the channels. That is, the communication node may perform the random backoff operation on the primary channel during a first period, and may perform the random backoff operation on the secondary channel during a second period. The first period may be a period having a length different from that of the second period.

If the communication node completes the random backoff operation on the primary channel, but detects a busy state of the secondary channel, the communication node may perform fallback transmission of a 10 MHz PPDU frame through the primary channel.

Figure 10:
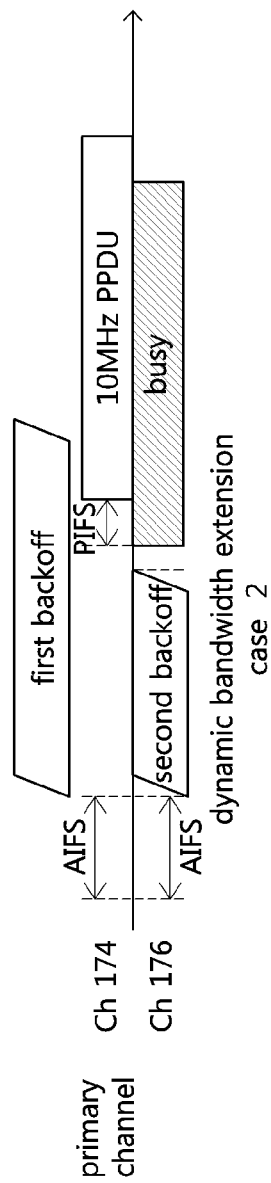
FIG. 10 is a conceptual diagram illustrating a second exemplary embodiment of a frame transmission operation through dynamic channel extension as a result of channel monitoring and random backoff operation on a primary channel and a secondary channel.

FIG. 10 is a conceptual diagram illustrating a second exemplary embodiment of a frame transmission operation through dynamic channel extension as a result of channel monitoring and random backoff operation on a primary channel and a secondary channel.

As shown in FIG. 10, a communication node may transmit a frame through two channels (e.g., channel 174 and channel 176). One channel (e.g., channel 174) of the two channels for frame transmission may be a primary channel, and the other channel (e.g., channel 176) may be a secondary channel for extension of the primary channel.

The communication node may monitor the channels (e.g., primary channel and/or secondary channel) before transmitting a real-time frame (e.g., frame including a video and/or voice payload, etc.). According to the exemplary embodiment of FIG. 10, the communication node may identify whether the channels are busy by monitoring the channels (e.g., primary channel and/or secondary channel) during a preset AIFS time period.

As a result of the channel monitoring, if the channels (e.g., primary channel and secondary channel) are not busy during the preset AIFS time period, the communication node may perform random backoff operations on the channels. The communication node may independently perform the random backoff operation on each of the channels. That is, the communication node may perform the random backoff operation on the primary channel during a first period, and may perform the random backoff operation on the secondary channel during a second period. The first period may be a period having a length different from that of the second period.

The communication node may complete the random backoff operation on the secondary channel. In addition, the communication node may further perform the random backoff operation on the primary channel even after completing the random backoff operation on the secondary channel. If the communication node detects a busy state of the secondary channel after completing the random back-off operation on the secondary channel, the communication node may perform monitoring on the primary channel during a PIFS time period from the time of detecting the busy state of the secondary channel, in addition to the random backoff operation on the primary channel.

As a result of the channel monitoring, after the communication node completes the random backoff operation during the second period, if the secondary channel is occupied by another communication node and the primary channel is not busy during the PIFS time period, the communication node may perform fallback transmission of a 10 MHz PPDU frame through the primary channel.

Figure 11:
FIG. 11 is a conceptual diagram illustrating a third exemplary embodiment of a frame transmission operation through dynamic channel extension as a result of channel monitoring and random backoff operation on a primary channel and a secondary channel.

FIG. 11 is a conceptual diagram illustrating a third exemplary embodiment of a frame transmission operation through dynamic channel extension as a result of channel monitoring and random backoff operation on a primary channel and a secondary channel.

As shown in FIG. 11, a communication node may transmit a frame through two channels (e.g., channel 174 and channel 176). One channel (e.g., channel 174) of the two channels for frame transmission may be a primary channel, and the other channel (e.g., channel 176) may be a secondary channel for extension of the primary channel.

The communication node may monitor the channels (e.g., primary channel and/or secondary channel) before transmitting a real-time frame (e.g., frame including a video and/or voice payload, etc.). According to the exemplary embodiment of FIG. 11, the communication node may identify whether the channels are busy by monitoring the channels (e.g., primary channel and/or secondary channel) during a preset AIFS time period.

As a result of the channel monitoring, if the channels (e.g., primary channel and secondary channel) are not busy during the preset AIFS time period, the communication node may perform random backoff operations on the channels. The communication node may independently perform the random backoff operation on each of the channels. That is, the communication node may perform the random backoff operation on the primary channel during a first period, and may perform the random backoff operation on the secondary channel during a second period. The first period may be a period having a length different from that of the second period.

The communication node may detect a busy state of the primary channel. Specifically, the communication node may detect the busy state of the primary channel before the completion of the random backoff operation on the secondary channel. In addition, the communication node may complete the random backoff operation on the secondary channel. When the communication node completes the random backoff operation on the secondary channel, the communication node may perform fallback transmission of a 10 MHz PPDU frame through the secondary channel.

Figure 12:
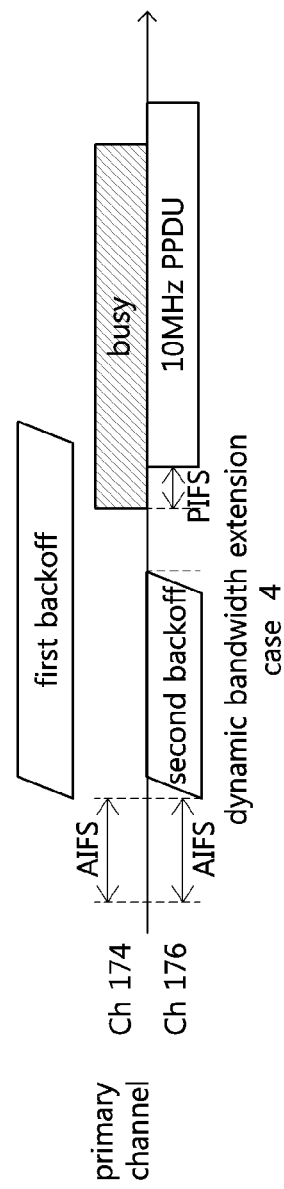
FIG. 12 is a conceptual diagram illustrating a fourth exemplary embodiment of a frame transmission operation through dynamic channel extension as a result of channel monitoring and random backoff operation on a primary channel and a secondary channel.

FIG. 12 is a conceptual diagram illustrating a fourth exemplary embodiment of a frame transmission operation through dynamic channel extension as a result of channel monitoring and random backoff operation on a primary channel and a secondary channel.

As shown in FIG. 12, a communication node may transmit a frame through two channels (e.g., channel 174 and channel 176). One channel (e.g., channel 174) of the two channels for frame transmission may be a primary channel, and the other channel (e.g., channel 176) may be a secondary channel for extension of the primary channel.

The communication node may monitor the channels (e.g., primary channel and/or secondary channel) before transmitting a real-time frame (e.g., frame including a video and/or voice payload, etc.). According to the exemplary embodiment of FIG. 12, the communication node may identify whether the channels are busy by monitoring the channels (e.g., primary channel and/or secondary channel) during a preset AIFS time period.

As a result of the channel monitoring, if the channels (e.g., primary channel and secondary channel) are not busy during the preset AIFS time period, the communication node may perform random backoff operations on the channels. The communication node may independently perform the random backoff operation on each of the channels. That is, the communication node may perform the random backoff operation on the primary channel during a first period, and may perform the random backoff operation on the secondary channel during a second period. The first period may be a period having a length different from that of the second period.

The communication node may complete the random backoff operation on the secondary channel. In addition, the communication node may further perform the random backoff operation on the primary channel even after completing the random backoff operation on the secondary channel. If the communication node detects a busy state of the primary channel after completing the random backoff operation on the secondary channel, the communication node may perform monitoring on the secondary channel during a PIFS time period from the time of detecting the busy state of the primary channel, in addition to the random backoff operation on the primary channel.

As a result of the channel monitoring, after the communication node completes the random backoff operation during the second period, if the primary channel is occupied by another communication node and the secondary channel is not busy during the PIFS time period, the communication node may perform fallback transmission of a 10 MHz PPDU frame through the secondary channel.

Figure 13:
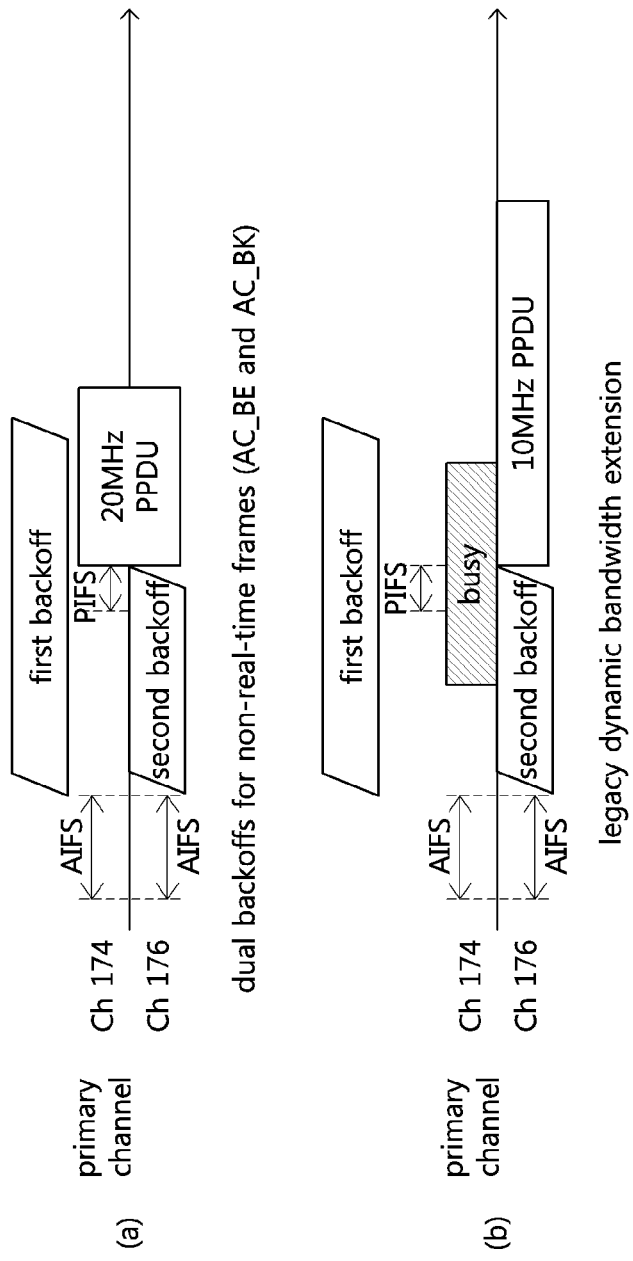
FIG. 13 is a conceptual diagram illustrating an exemplary embodiment of frame transmission through at least one channel as a result of channel monitoring and random backoff operation on a primary channel and a secondary channel.

FIG. 13 is a conceptual diagram illustrating an exemplary embodiment of frame transmission through at least one channel as a result of channel monitoring and random backoff operation on a primary channel and a secondary channel.

As shown in FIG. 13, the communication node may transmit a frame through two channels (e.g., channel 174 and channel 176). Hereinafter, the channel 174 may be referred to as a first channel, and the channel 176 may be referred to as a second channel.

The communication node may perform monitoring on the channels (e.g., the first channel and/or the second channel) before transmitting a non-real-time frame (e.g., frame including a best effort and/or background payload, etc.). According to the exemplary embodiment of FIG. 13, when one channel among the channels is occupied by another communication node, the communication node may wait until the busy state of the occupied one channel ends.

When the one occupied channel transitions from the busy state to the idle state, the communication node may identify whether the channels (e.g., the first channel and the second channel) are busy by monitoring the channels during a preset AIFS time period.

As a result of the channel monitoring, if the channels (e.g., primary channel and secondary channel) are not busy during the preset AIFS time period, the communication node may perform random backoff operations on the channels. The communication node may independently perform the random backoff operation on each of the channels. That is, the communication node may perform the random backoff operation on the primary channel during a first period, and may perform the random backoff operation on the secondary channel during a second period. The first period may be a period having a length different from that of the second period. The communication node may determine a primary channel among the channels by comparing the lengths of the first period and the second period. As in the exemplary embodiment of FIG. 13, when the first period is longer than the second period, the communication node may configure the second channel as a primary channel and configure the first channel as a secondary channel.

The communication node may perform a random backoff operation for channel access on the primary channel (e.g., the second channel) and may perform a random backoff operation on the secondary channel (e.g., the first channel). In addition, the communication node may perform a channel monitoring operation on the secondary channel during a preset time period. The length of the preset time period may be a PIFS, and the ending time of the PIFS may be the same as the time of completing the random backoff operation on the primary channel. According to the exemplary embodiment of (a) of FIG. 13, if the communication node completes the second random backoff operation on the primary channel, and at the same time, the secondary channel is in the idle state during the PIFS time period as a result of the channel monitoring on the secondary channel, the communication node may immediately transmit a frame through the primary and secondary channels. On the other hand, according to the exemplary embodiment of (b) of FIG. 13, as a result of the channel monitoring on the secondary channel, if the secondary channel is in the busy state during the PIFS time period, the communication node may not transmit a frame through the secondary channel, and may perform fallback transmission of the frame only through the primary channel.

Figure 14:
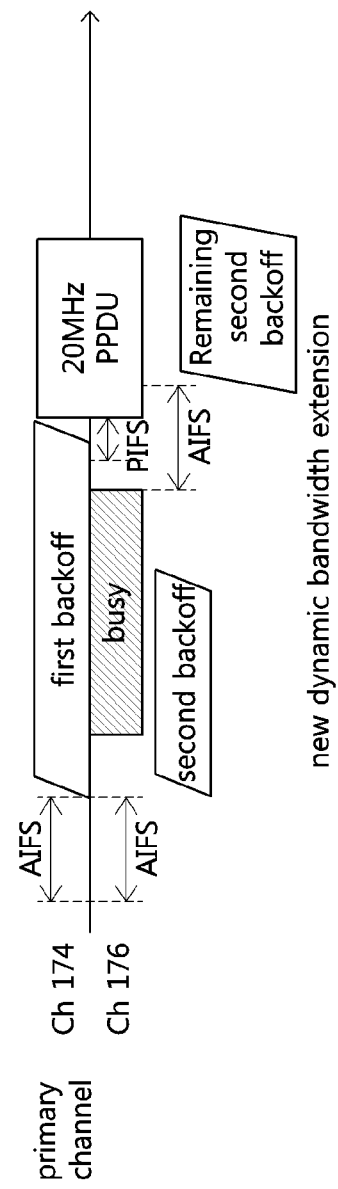
FIG. 14 is a conceptual diagram illustrating a second exemplary embodiment of a frame transmission operation through a 20 MHz channel as a result of channel monitoring and random backoff operation on a primary channel and a secondary channel.

FIG. 14 is a conceptual diagram illustrating a second exemplary embodiment of a frame transmission operation through a 20 MHz channel as a result of channel monitoring and random backoff operation on a primary channel and a secondary channel.

As shown in FIG. 14, the communication node may transmit a frame through two channels (e.g., channel 174 and channel 176). Hereinafter, the channel 174 may be referred to as a first channel, and the channel 176 may be referred to as a second channel.

The communication node may perform monitoring on the channels (e.g., the first channel and/or the second channel) before transmitting a non-real-time frame (e.g., frame including a best effort and/or background payload, etc.). According to the exemplary embodiment of FIG. 14, when one channel among the channels is occupied by another communication node, the communication node may wait until the busy state of the occupied one channel ends.

When the one occupied channel transitions from the busy state to the idle state, the communication node may identify whether the channels (e.g., the first channel and the second channel) are busy by monitoring the channels during a preset AIFS time period.

As a result of the channel monitoring, if the channels (e.g., primary channel and secondary channel) are not busy during the preset AIFS time period, the communication node may perform random backoff operations on the channels. The communication node may independently perform the random backoff operation on each of the channels. That is, the communication node may perform the random backoff operation on the primary channel during a first period, and may perform the random backoff operation on the secondary channel during a second period. The first period may be a period having a length different from that of the second period. Specifically, the first period may be AC_BE of FIG. 4, and the second period may be AC_BK of FIG. 4. The communication node may determine a primary channel among the channels by comparing the lengths of the first period and the second period. As in the exemplary embodiment of FIG. 14, when the first period is longer than the second period, the communication node may configure the second channel as a primary channel and configure the first channel as a secondary channel.

The communication node may perform a random backoff operation for channel access on the primary channel (e.g., the second channel) and may perform a random backoff operation on the secondary channel (e.g., the first channel). In addition, the communication node may perform a channel monitoring operation on the secondary channel during a preset time period. The length of the preset time period may be a PIFS, and the ending time of the PIFS may be the same as the time of completing the random backoff operation on the secondary channel (e.g., the first channel).

The communication node may detect a busy state of the primary channel (e.g., the second channel). As a result of the channel monitoring on the secondary channel, if the secondary channel is idle during the PIFS time period, the communication node may change the configuration of the primary channel and the secondary channel. Specifically, when the first period is shorter than a sum of the lengths of the second period, the busy period of the second channel, and the AIFS time period, the communication node may change the configuration by configuring the first channel as a primary channel. The communication node may change the configuration by configuring the second channel as a secondary channel, and may perform a channel monitoring operation on the changed secondary channel during a preset time period. The length of the preset time period may be a PIFS, and the ending time of the PIFS may be the same as the time of completing the random backoff operation on the changed primary channel.

If the random backoff operation is completed on the changed primary channel (e.g., the first channel), and the changed secondary channel (e.g., the second channel) is in the idle state during the PIFS time period as a result of the channel monitoring on the changed secondary channel, the communication node may transmit a frame through the primary channel and the secondary channel.

In FIGS. 7 to 14, the communication node may perform the same operation not only for the 10 MHz channel but also for the 20 MHz channel. The communication node intending to transmit a 20 MHz PPDU may perform random backoff operations on a plurality of channels by using a plurality of backoff counters, and then transmit a frame through channels on which the random backoff operations are completed. The transmission starting times and the transmission ending times of frames transmitted through all channels may be the same, respectively. When the transmission ending times of the respective frames are different, the communication node may add padding to shorter frames to match the ending times of the frames. Here, the term 'channel' may be replaced by a term 'link'. The primary channel may be referred to as 'one link' or 'primary link', the secondary channel may be referred to as 'another link' or 'secondary link', and a link may include a channel. A 10 MHz PPDU may mean a frame transmitted using only one link.

Figure 15:
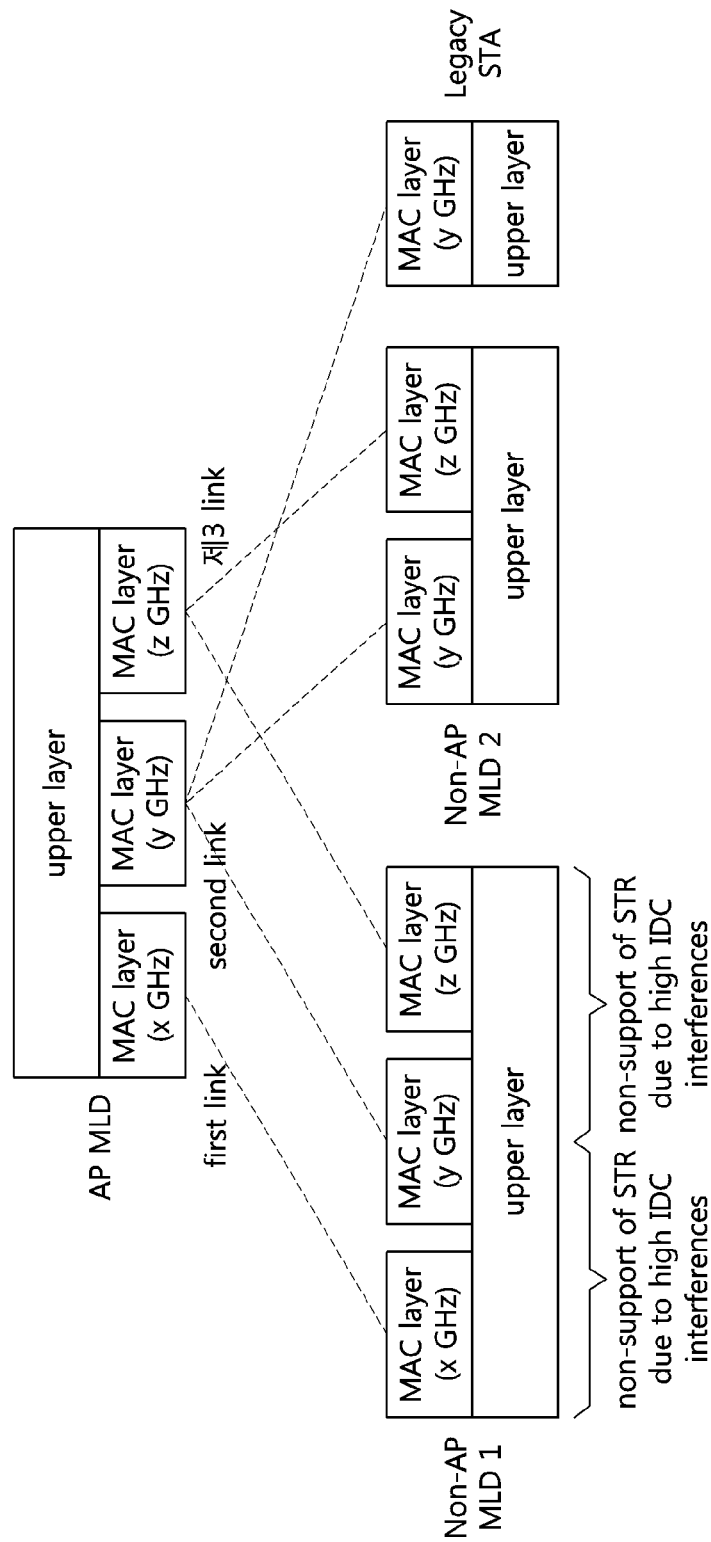
FIG. 15 is a conceptual diagram illustrating an exemplary embodiment of a structure of a multi-link established between an AP and a STA of a communication node.

FIG. 15 is a conceptual diagram illustrating an exemplary embodiment of a structure of a multi-link established between an AP and a STA of a communication node.

As shown in FIG. 15, a communication node may perform frame transmission/reception operations using a multi-link by applying a non-contiguous bandwidth extension technique (e.g., 80 MHz+80 MHz transmission). The communication node using a multi-link may perform multi-band transmission. For example, the communication node may perform frame transmission by using a 40 MHz bandwidth through the conventional channel extension scheme in the 2.4 GHz band, and a 160 MHz bandwidth through the conventional channel extension scheme in the 5 GHz band. Alternatively, the communication node may perform communication by using a 160 MHz bandwidth in the 6 GHz band while performing communication using a 160 MHz bandwidth in the 5 GHz band. One frequency band used by the communication node may be defined as one link. Alternatively, the communication node may establish a plurality of links in one frequency band. For example, the communication node may establish one link in the 2.4 GHz band and two links in the 6 GHz band.

The AP and the communication node (e.g., STA) supporting the multi-link operation may perform an access operation and a negotiation operation for the multi-link operation to configure the number of links and links to be used. The communication node may identify information on band(s) capable of performing communication with the wireless AP. The communication node may configure a part or all of the links supported by the wireless AP to be used for the multi-link operation in a negotiation procedure through the multi-link operation with the wireless AP. A communication node that does not perform the multi-link operation (e.g., IEEE 802.11a/b/g/n/ac/ax communication node) may be connected to some links supported by the AP.

Some of the links available in the wireless AP may have sufficient band separations, so that one communication node can perform simultaneous transmission and reception operations by using the links. On the other hand, if some of the links available in the wireless AP do not have sufficient band separations, simultaneous transmission and reception operations using the links may not be possible due to a phenomenon (e.g., in-device coexistence (IDC) interference) in which transmission on one link causes interference to another link within the communication node. For example, the communication node may configure a multi-link including a first link, a second link, and a third link with the AP. If a band separation between the first link and the third link is sufficient, the communication node may receive a frame through the third link at the same time while transmitting a frame through the first link. On the other hand, if the band separation between the first link and the third link is insufficient, the communication node transmitting a frame through the first link may not receive a frame through the second link.

Figure 16:
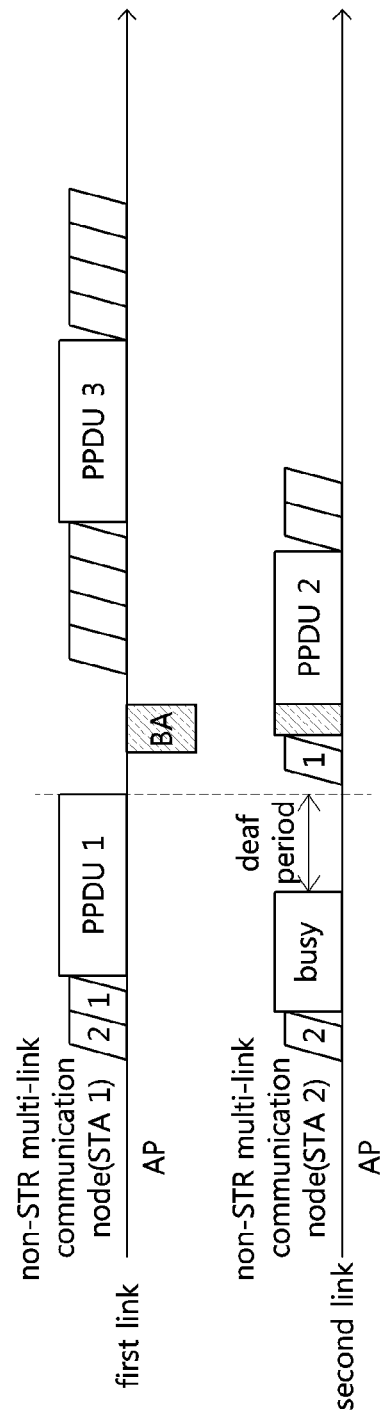
FIG. 16 is a conceptual diagram illustrating a first exemplary embodiment of a frame transmission operation through at least one link among a plurality of links as a result of random backoff operations on the plurality of links.

FIG. 16 is a conceptual diagram illustrating a first exemplary embodiment of a frame transmission operation through at least one link among a plurality of links as a result of random backoff operations on the plurality of links.

As shown in FIG. 16, a communication node may transmit frames through a plurality of links (e.g., a first link and a second link). The communication node of FIG. 16 may be a multi-link device (MLD) supporting multi-link communication. In addition, the communication node of FIG. 16 may be a non-simultaneous transmit and receive (non-STR) MLD that cannot simultaneously perform a frame transmission operation and a frame reception operation. The MLD may use a different MAC address for each link, so that it can operate as if a different communication node exists for each link although it is a single communication device. For example, an operation of a first MLD having the first link and the second link may be regarded as that a first STA operates on the first link and a second STA operates on the second link.

The communication node may perform random backoff operations on the links. The communication node may independently perform the random backoff operation on each of the links. That is, the communication node may perform the random backoff operation on the first link during a first period, and may perform the random backoff operation on the second link during a second period. The first period may be a period having a length different from that of the second period. In order to determine the first period and the second period, the communication node may select random backoff counter values according to a rule set for each AC according to a type of a frame to be transmitted when performing the random backoff. The communication node may randomly select two random backoff counters to be applied to the first period and the second period at the same time.

The communication node (e.g., first STA) may complete the random backoff operation on the first link among the links. In addition, the communication node (e.g., the second STA) may detect a busy state of the second link during the random backoff operation on the second link. The first STA of the communication node may access the first link and may transmit a first PPDU through the first link. On the other hand, when the first STA of the communication node transmits the first PPDU through the first link, the second STA of the communication node may not be able to perform a frame reception operation through the second link even after the busy state of the second link ends. Specifically, while the first STA of the communication node transmits the first PPDU, the second STA of the communication node may not perform a link sensing operation on the second link because the second STA of the communication node cannot perform a reception operation on the second link. A period in which the second STA of the communication node cannot perform the link sensing operation on the second link may be referred to as a 'deaf period'. During the deaf period, the second STA of the communication node may freeze the random backoff operation on the second link.

When the first STA of the communication node has completed transmitting the first PPDU on the first link, the deaf period of the second STA of the communication node may end. The second STA of the communication node may resume the random backoff operation on the second link. When the random backoff operation on the second link is completed as a result of the resumption of the random backoff operation of the second STA of the communication node, the second STA of the communication node may transmit a second PPDU on the second link.

Figure 17:
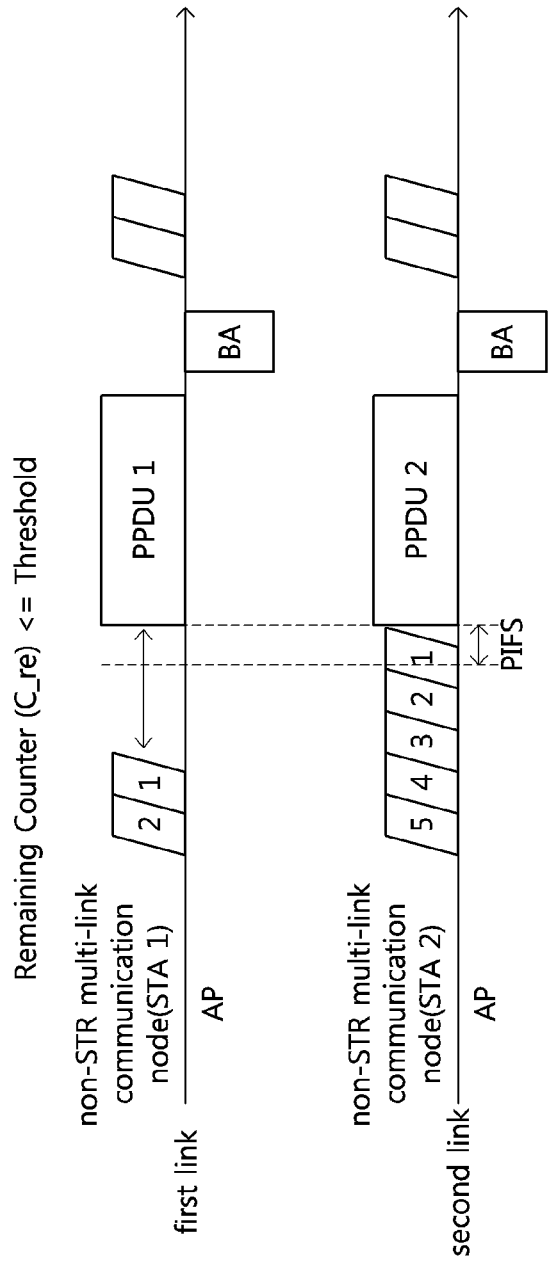
FIG. 17 is a conceptual diagram illustrating a second exemplary embodiment of a frame transmission operation through at least one link among a plurality of links as a result of random backoff operations on the plurality of links.

FIG. 17 is a conceptual diagram illustrating a second exemplary embodiment of a frame transmission operation through at least one link among a plurality of links as a result of random backoff operations on the plurality of links.

As shown in FIG. 17, a communication node may transmit frames through a plurality of links (e.g., a first link and a second link). The communication node of FIG. 17 may be a non-STR MLD that cannot simultaneously perform a frame transmission operation and a frame reception operation. The MLD may use a different MAC address for each link, so that it can operate as if a different communication node exists for each link although it is a single communication device. For example, an operation of a first MLD having the first link and the second link may be regarded as that a first STA operates on the first link and a second STA operates on the second link.

The communication node may perform random backoff operations on the links. The communication node may independently perform the random backoff operation on each of the links. That is, the communication node may perform the random backoff operation on the first link during a first period, and may perform the random backoff operation on the second link during a second period. The first period may be a period having a length different from that of the second period. In order to determine the first period and the second period, the communication node may select random backoff counter values according to a rule set for each AC according to a type of a frame to be transmitted when performing the random backoff. The communication node may randomly select two random backoff counters to be applied to the first period and the second period at the same time.

The communication node (e.g., the first STA) may complete the random backoff operation on one link (e.g., the first link) among the links. The first STA of the communication node may identify a remaining random backoff counter value of the second STA of the communication node at the time of completing the random backoff operation on the first link. The first STA of the communication node may determine whether to transmit a first PPDU based on a result of comparison between the remaining random backoff counter value of the second STA of the communication node and a preset threshold. The preset threshold may be proportional to a transmission time of the PPDU. Alternatively, the preset threshold may be proportional to a delay limit value of the PPDU. The first STA of the communication node may adjust the preset threshold by reflecting a normalization factor. The normalization factor may be a number greater than 0 and less than or equal to 1.

When the remaining random backoff counter value of the second STA of the communication node is less than the preset threshold, the first STA of the communication node may wait before transmitting the first PPDU through the first link. The second STA of the communication node may perform the random backoff operation on the second link. In addition, the first STA of the communication node may perform a link monitoring operation on the first link during a preset time period. The length of the preset time period may be a PIFS, and the ending time of the PIFS may be the same as the time of completing the random backoff operation on the second link of the second STA of the communication node. For example, the first STA of the communication node may perform an energy detection (ED) operation to detect a frame from another communication node.

As a result of the link monitoring operation of the first STA of the communication node, if the first link is in the idle state during the PIFS time period and the second STA completes the random backoff operation on the second link, the communication node may transmit frames through the first link and the second link.

As a result of the link monitoring operation of the first STA of the communication node, if the first link is busy during the PIFS time period, the communication node (e.g., the second STA) may transmit the first PPDU and a second PPDU through the second link. In addition, when the second STA of the communication node detects a busy state of the second link during the random backoff operation, the communication node (e.g., the first STA) may transmit the first PPDU and the second PPDU. When the first PPDU and the second PPDU exceed a maximum transmission period (MAX TXOP), the communication node may transmit the first PPDU and the second PPDU by using a fragmentation scheme.

Figure 18:
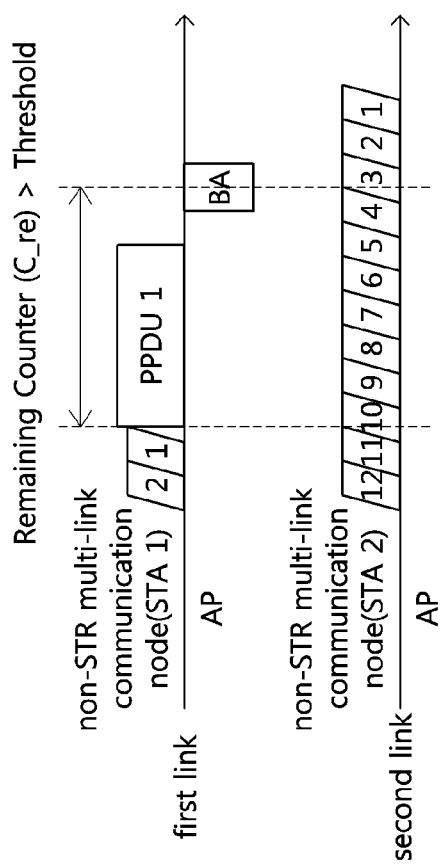
FIG. 18 is a conceptual diagram illustrating a third exemplary embodiment of a frame transmission operation through at least one link among a plurality of links as a result of random backoff operations on the plurality of links.

FIG. 18 is a conceptual diagram illustrating a third exemplary embodiment of a frame transmission operation through at least one link among a plurality of links as a result of random backoff operations on the plurality of links.

As shown in FIG. 18, a communication node may transmit frames through a plurality of links (e.g., a first link and a second link). The communication node of FIG. 18 may be a non-STR MLD that cannot simultaneously perform a frame transmission operation and a frame reception operation. The MLD may use a different MAC address for each link, so that it can operate as if a different communication node exists for each link although it is a single communication device. For example, an operation of a first MLD having the first link and the second link may be regarded as that a first STA operates on the first link and a second STA operates on the second link.

The communication node may perform random backoff operations on the links. The communication node may independently perform the random backoff operation on each of the links. That is, the communication node may perform the random backoff operation on the first link during a first period, and may perform the random backoff operation on the second link during a second period. The first period may be a period having a length different from that of the second period. In order to determine the first period and the second period, the communication node may select random backoff counter values according to a rule set for each AC according to a type of a frame to be transmitted when performing the random backoff. The communication node may randomly select two random backoff counters to be applied to the first period and the second period at the same time.

The communication node (e.g., the first STA) may complete the random backoff operation on one link (e.g., the first link) among the links. The first STA of the communication node may identify a remaining random backoff counter value of the second STA of the communication node at the time of completing the random backoff operation on the first link. The first STA of the communication node may determine whether to transmit a first PPDU based on a result of comparison between the remaining random backoff counter value of the second STA of the communication node and a preset threshold. The preset threshold may be proportional to a transmission time of a frame or a delay limit value of a frame. The first STA of the communication node may adjust the preset threshold by reflecting a normalization factor.

When the remaining random backoff counter value of the second STA of the communication node is greater than the preset threshold, the first STA of the communication node may transmit the first PPDU and a second PPDU through the first link. When the first PPDU and the second PPDU exceed a maximum transmission period (MAX TXOP), the communication node may transmit the first PPDU and the second PPDU by using a fragmentation scheme.

Figure 19:
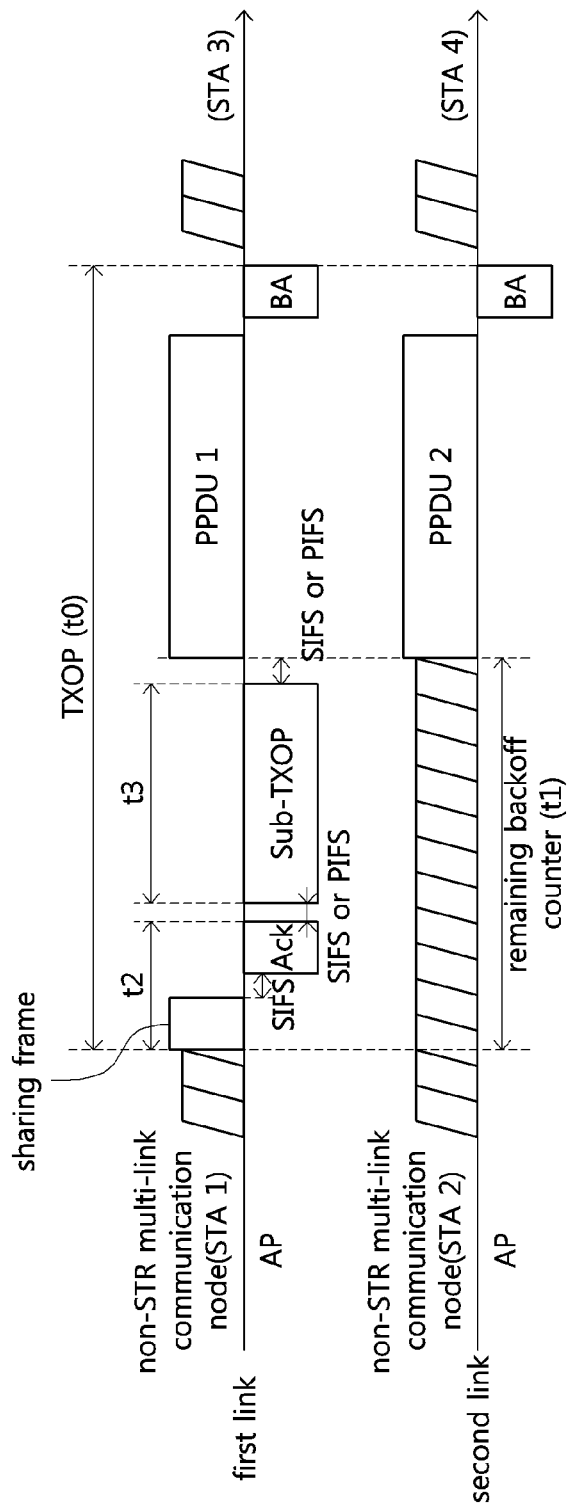
FIG. 19 is a conceptual diagram illustrating a fourth exemplary embodiment of a frame transmission operation through at least one link among a plurality of links as a result of random backoff operations on the plurality of links.

FIG. 19 is a conceptual diagram illustrating a fourth exemplary embodiment of a frame transmission operation through at least one link among a plurality of links as a result of random backoff operations on the plurality of links.

As shown in FIG. 19, a first communication node may transmit frames through a plurality of links (e.g., a first link and a second link). The first communication node of FIG. 19 may be a non-STR MLD that cannot simultaneously perform a frame transmission operation and a frame reception operation. The MLD may use a different MAC address for each link, so that it can operate as if a different first communication node exists for each link although it is a single communication device. For example, an operation of a first MLD having the first link and the second link may be regarded as that a first STA operates on the first link and a second STA operates on the second link.

The first communication node may perform random backoff operations on the links. The first communication node may independently perform the random backoff operation on each of the links. That is, the communication node may perform the random backoff operation on the first link during a first period, and may perform the random backoff operation on the second link during a second period. The first period may be a period having a length different from that of the second period. In order to determine the first period and the second period, the first communication node may select random backoff counter values according to a rule set for each AC according to a type of a frame to be transmitted when performing the random backoff. The first communication node may randomly select two random backoff counters to be applied to the first period and the second period at the same time.

The first communication node (e.g., the first STA) may complete the random backoff operation on one link (e.g., the first link) among the links. The first STA of the first communication node having completed the random backoff operation may acquire a transmission opportunity (TXOP). However, the first STA of the first communication node may delay transmission of a frame (e.g., first PPDU) until the random backoff of the second STA of the first communication node is completed. The first STA having completed the random backoff operation on the first link may transmit a sharing frame to a second communication node including an AP through the first link. A value of a duration field in a MAC header of the sharing frame may be set to (length t0 of the TXOP–transmission length of the sharing frame) according to the 802.11 specification. Alternatively, the value of the duration field of the MAC header according to an exemplary embodiment of the present disclosure may be set to (t2–length of the sharing frame). The sharing frame may have a structure described below.

Figure 20:
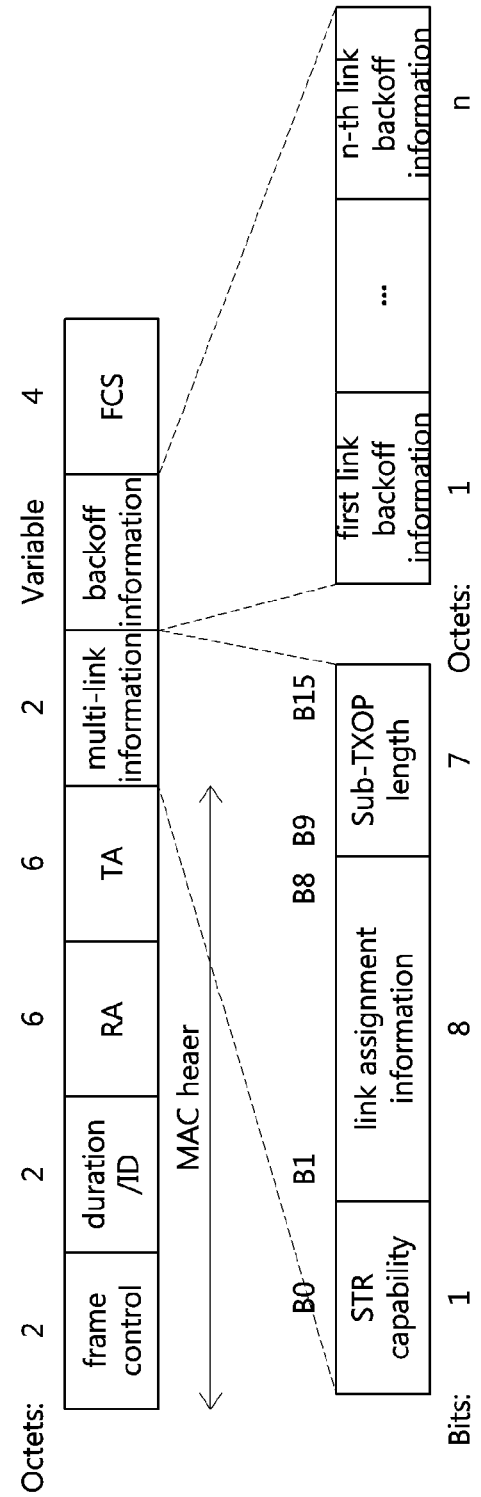
FIG. 20 is a conceptual diagram illustrating an exemplary embodiment of a structure of a sharing frame transmitted by a first communication node.

FIG. 20 is a conceptual diagram illustrating an exemplary embodiment of a structure of a sharing frame transmitted by a first communication node.

As shown in FIG. 20, the sharing frame transmitted by the first communication node may include a basic MAC header part, a multi-link information field indicating multi-link information, a backoff information field indicating information on a random backoff operation, and an error detection part (i.e., frame check sequence (FCS)) used to detect whether there is an error in the transmitted sharing frame. The MAC header part may include a frame control field for configuring a frame type and the like, and a duration/ID field for configuring a TXOP. In addition, the MAC header of the sharing frame may further include a receiver address (RA) field and a transmitter address (TA) field of the sharing frame.

The sharing frame may further include the multi-link information field indicating multi-link information, the backoff information field indicating information on a random backoff operation, and an FCS for detecting an error in the sharing frame.

The multi-link information field may indicate whether simultaneous transmit/receive (STR) is supported (i.e., STR capability), link assignment information (i.e., assigned link bitmap), a length of a Sub-TXOP, and the like. The STR capability field may indicate whether the first communication node supports simultaneous frame transmission/reception. When the first communication node supports simultaneous frame transmission/reception, a bit of the STR capability field may be set to 0, and the sharing frame may not include the backoff information field. The link assignment information field may indicate links currently used for frame transmission among links assigned to the first communication node. When the first communication node configures a multi-link with the AP, the link assignment field may indicate links currently used in transmission among all the links assigned to the first communication node. Bits of the link assignment information field may be mapped in the order of assigned link numbers. A bitmap of the link assignment information field may have a size of 8 bits and may indicate up to 8 links currently being used for data transmission among eight assigned links. For example, if the bitmap of the link assignment information field is set to '1100000', the first link and the second link are currently used for transmission, and the backoff information field may include backoff information of the two links. The length of the Sub-TXOP may indicate a period available for transmission without a separate channel access procedure from a time after an SIFS time period elapses from the time of completing the transmission of the sharing frame to the time of completing the random backoff operation on the second link. The Sub-TXOP may use the same time unit as the duration field of the MAC header.

The link backoff information field may include information on a remaining backoff counter value to be used in another link. When starting channel access to multi-links, the first communication node may randomly select as many backoff counters as the number of links, and may start random backoff operations with one backoff counter value among the selected backoff counters. The first communication node may use the smallest backoff counter value among the selected backoff counter values for a link through which the sharing frame is to be transmitted. The link backoff information field may include information on remaining random backoff counter values of other links at the time of transmitting the sharing frame. Upon receiving the remaining random backoff counter value, the AP may set and use a time value obtained by subtracting a time consumed for transmission of the sharing frame from the received remaining backoff counter value as a remaining backoff counter value to be actually used.

Referring back to FIG. 19, the second communication node including the AP may receive the sharing frame through the first link of the first communication node (e.g., the first MLD). The second communication node including the AP may calculate a transmission period (i.e., Sub-TXOP) of the second communication node based on the parameters of the received sharing frame. The transmission period (i.e., Sub-TXOP) of the second communication node may be calculated through an equation <t1-t2-2*(SIFS or PIFS)>. The second communication node may transmit ACK for the sharing frame to the first communication node (e.g., the first STA) after a preset period (e.g., SIFS) elapses from the time of receiving the sharing frame. The ACK may have a structure described below.

Figure 21:
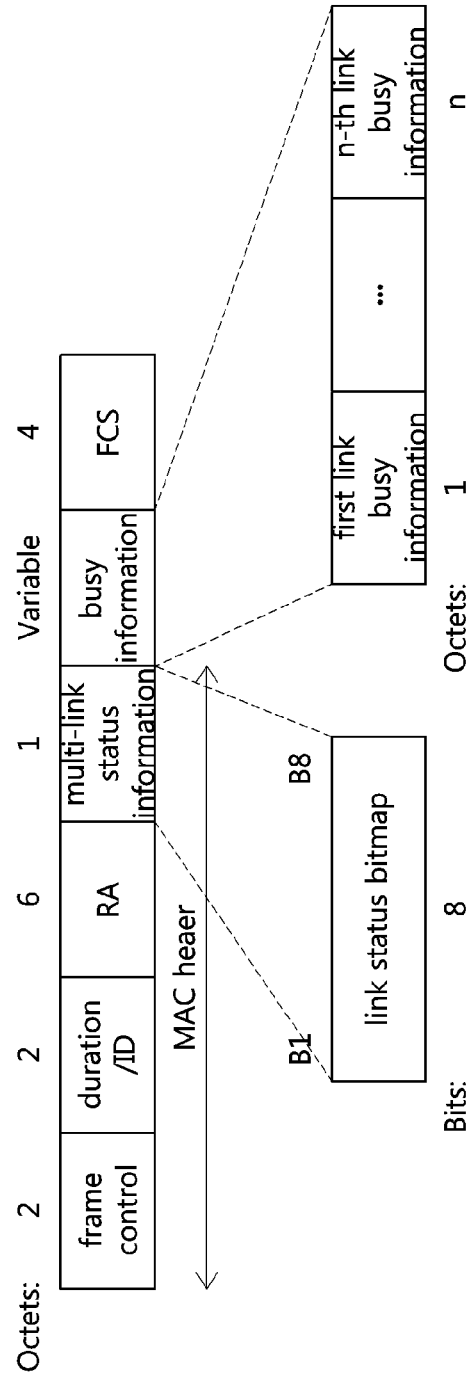
FIG. 21 is a conceptual diagram illustrating an exemplary embodiment of a structure of an ACK frame for a sharing frame.

FIG. 21 is a conceptual diagram illustrating an exemplary embodiment of a structure of an ACK frame for a sharing frame.

As shown in FIG. 21, the ACK frame for the sharing frame may include a MAC header part, a link status information part including link status information, and an error detection part used to detect whether the transmitted ACK frame has an error. The MAC header part may include a frame control field for configuring a frame type, a duration/ID field for configuring a TXOP, a receiver address field, and the like.

The ACK frame may further include a multi-link status information field indicating statuses of the multi-link, a busy information field indicating occupancy information, and an error detection part (i.e., frame check sequence (FCS)) used to detect whether the transmitted ACK frame has an error.

The multi-link status information field may further include a link status bitmap. The multi-link status information field may indicate a link occupied by another communication node during transmission of the sharing frame among a plurality of links currently used for transmission indicated by the bitmap of the link assignment information field of the sharing frame. For example, when the multi-link status information field is set to '01000000', it may indicate that the second link was occupied by another communication node during transmission of the sharing frame.

The busy information field may indicate occupancy information of each of the links, for which a corresponding bit in the link status bitmap is set to 1. The busy information field may be configured based on information on a transmission time of the frame occupying the link, and may be configured as a remaining transmission time after the ACK frame is transmitted based on the duration field value of the MAC header. If the second communication node including the AP does not allow use of some links among the multi-links that the first communication node requested to use through the sharing frame, the second communication node may set a bit corresponding to a link that is not allowed to use in the multi-link status information field to 1, and may set a period, that is not allowed, in the busy information field.

Referring back to FIG. 19, the second communication node having transmitted the ACK may wait for a preset time period (e.g., SIFS or PIFS) for ED or PD sensing on the first link, and then transmit a frame through the first link during a Sub-TXOP time period. During the Sub-TXOP time period, the second communication node may transmit a frame to an arbitrary STA including the first STA that is a non-STR MLD. The second communication node may transmit only a frame having a length within a time period of t3. If there is no payload to be transmitted to an arbitrary STA, the second communication node may not transmit a frame during the Sub-TXOP time period, or transmit a Quality of service (QoS) null frame in which a duration value of a MAC header is set to the value of the Sub-TXOP.

After the Sub-TXOP, the first STA may perform a link monitoring operation on the first link during a preset time period. The length of the preset time period may be a PIFS, and the ending time of the PIFS may be the same as the time of completing the random backoff operation of the second STA on the second link. For example, the first STA may detect a frame from another first communication node by performing an ED or PD sensing operation.

As a result of the link monitoring operation of the first STA, if the first link is in the idle state during the PIFS time period and the second STA completes the random backoff operation on the second link, the first communication node may simultaneously transmit the first PPDU and the second PPDU through the first link and the second link.

The second communication node including the AP may receive the first PPDU and the second PPDU through the first link and the second link, and after a SIFS time period, the second communication node may simultaneously transmit block ACK (BA) frames respectively indicating reception statuses of the first and second PPDUs through the first link and the second link. If a busy state of the second link is detected while performing the random backoff operation on the second link, the first communication node (e.g., STA 1) may transmit the first PPDU and the second PPDU through the first link.

Figure 22A:
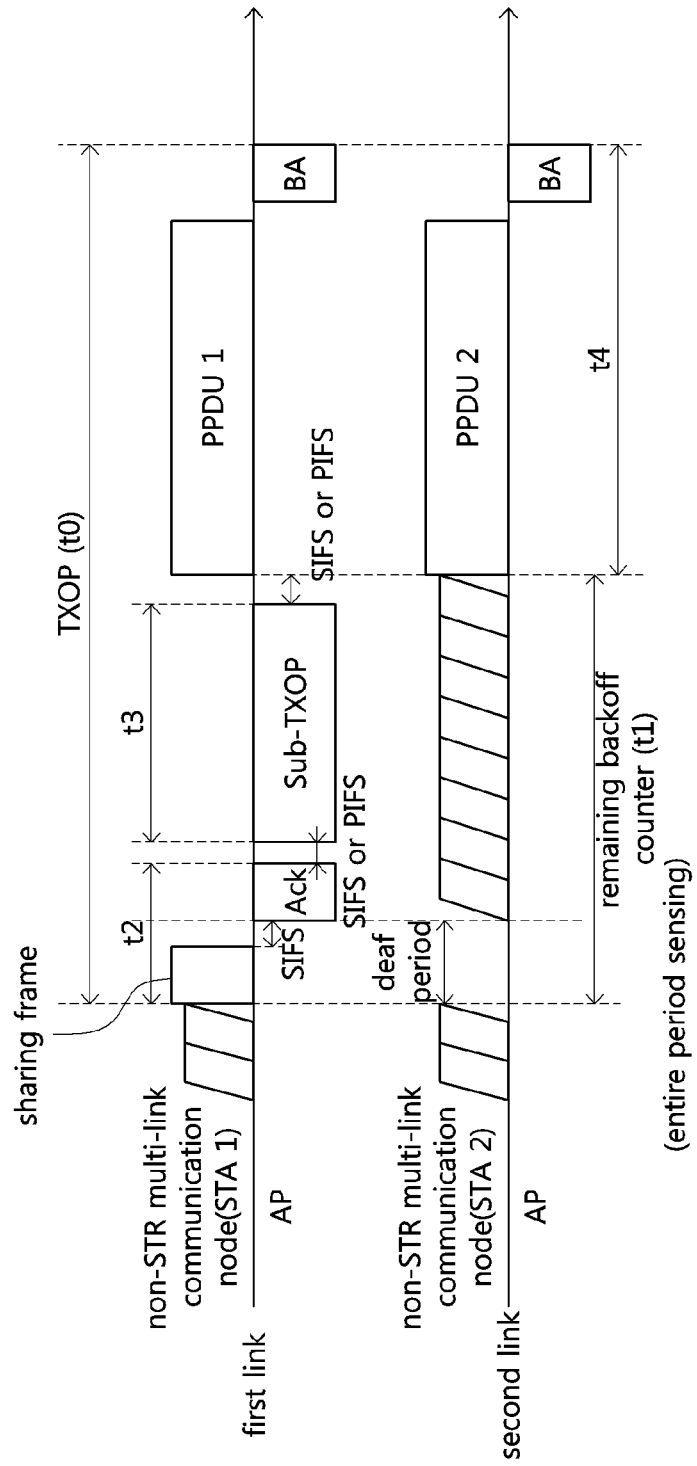
FIG. 22A is a conceptual diagram illustrating a fifth-first exemplary embodiment of a frame transmission operation through at least one link among a plurality of links as a result of random backoff operations on the plurality of links.
Figure 22B:
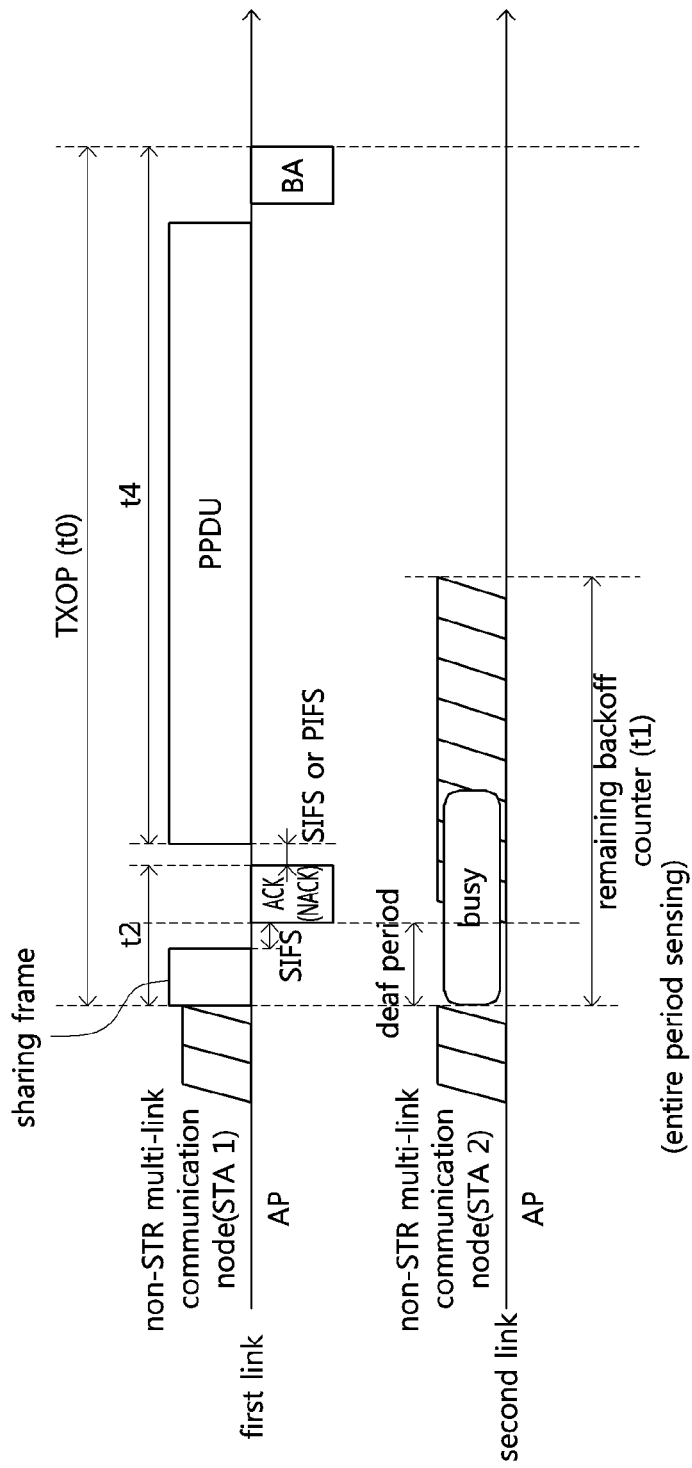
FIG. 22B is a conceptual diagram illustrating a fifth-second exemplary embodiment of a frame transmission operation through at least one link among a plurality of links as a result of random backoff operations on the plurality of links.
Figure 22C:
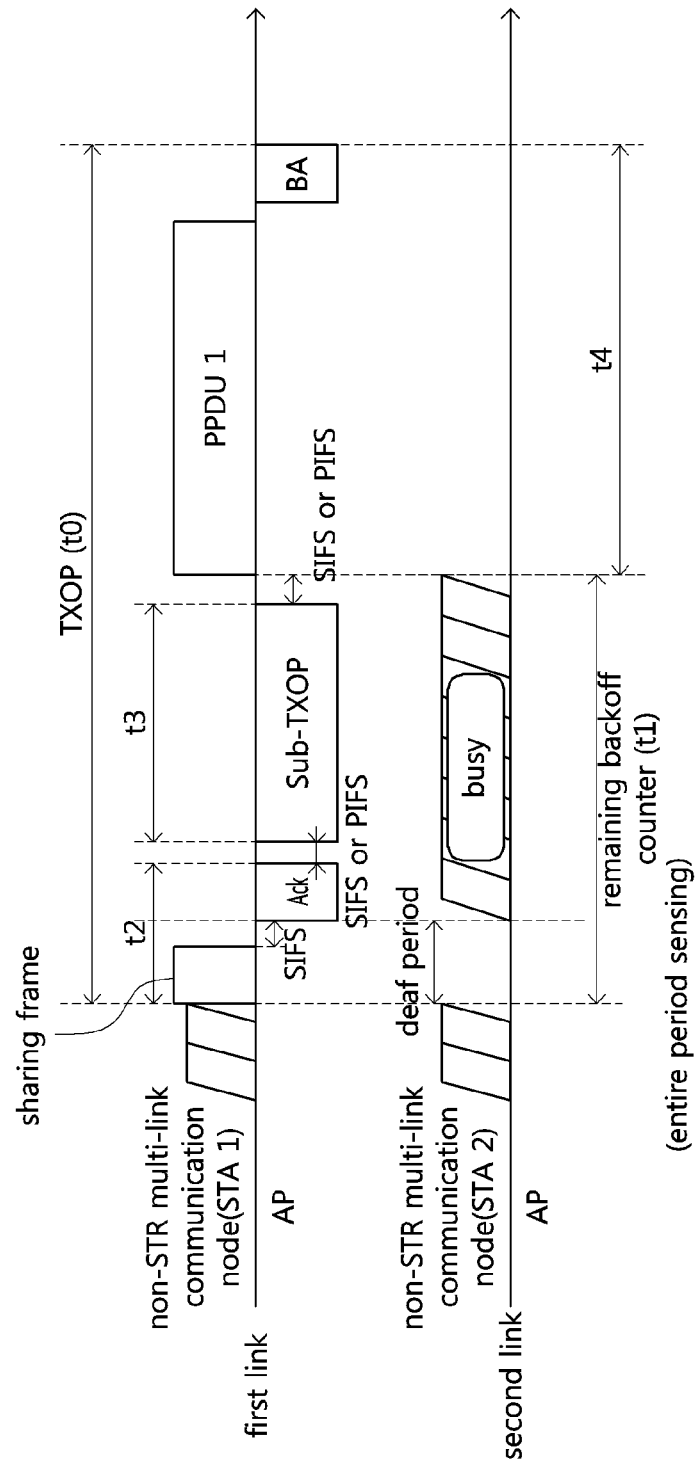
FIG. 22C is a conceptual diagram illustrating a fifth-third exemplary embodiment of a frame transmission operation through at least one link among a plurality of links as a result of random backoff operations on the plurality of links.

FIGS. 22A to 22C are conceptual diagrams illustrating a fifth exemplary embodiment of a frame transmission operation through at least one link among a plurality of links as a result of random backoff operations on the plurality of links.

As shown in FIGS. 22A to 22C, a first communication node may transmit frames through a plurality of links (e.g., a first link and a second link). The first communication node of FIGS. 22A to 22C may be a non-STR MLD that cannot simultaneously perform a frame transmission operation and a frame reception operation. The MLD may use a different MAC address for each link, so that it can operate as if a different first communication node exists for each link although it is a single communication device. For example, an operation of a first MLD having the first link and the second link may be regarded as that a first STA operates on the first link and a second STA operates on the second link.

The first communication node may perform random backoff operations on the links. The first communication node may independently perform the random backoff operation on each of the links. That is, the communication node may perform the random backoff operation on the first link during a first period, and may perform the random backoff operation on the second link during a second period. The first period may be a period having a length different from that of the second period. In order to determine the first period and the second period, the first communication node may select random backoff counter values according to a rule set for each AC according to a type of a frame to be transmitted when performing the random backoff. The first communication node may randomly select two random backoff counters to be applied to the first period and the second period at the same time.

The first communication node (e.g., the first STA) may complete the random backoff operation on one link (e.g., the first link) among the links. The first STA having completed the random backoff operation on the first link may transmit a sharing frame to the second communication node including the AP through the first link. Specifically, when the random backoff counter value of the second link is greater than (transmission time of the sharing frame+SIFS+ACK frame transmission time+$\alpha$), the first communication node may transmit the sharing frame to the second communication node including the AP. On the other hand, when the random backoff counter value of the second link is less than (transmission time of the sharing frame+SIFS+ACK frame transmission time+$\alpha$), the first communication node may transmit frames through the first and second links after completing the random backoff operation on the second link.

The value of the duration field of the MAC header according to an exemplary embodiment of the present disclosure may be set to a sum of (the maximum value among random backoff counter values randomly selected to be applied to a plurality of links currently used by the MLD for frame transmission+PPDU transmission time+BA transmission time). $\alpha$ may be a time corresponding to (Sub-TXOP+2*(SIFS or PIFS)), and the non-STR MLD may transmit the sharing frame including the duration value of the MAC header, and receive ACK. The first communication node may configure a period corresponding to the duration value as a TXOP, which is a time available for transmission.

A time waiting for the longest backoff counter of the plurality of links within the configured TXOP may be given so that another communication node can use the time for transmission, and such the time is denoted as a 'Sub-TXOP' in the present disclosure. $\alpha$ may be 0, and this case may correspond to a case where a PPDU is transmitted immediately after a SIFS time after receiving the ACK, and it has only an effect of configuring the TXOP of the first link. The receiver Address (RA) of the sharing frame may indicate the second communication node including the AP, which allows to use the Sub-TXOP. The transmitter address (TA) of the sharing frame may indicate the first STA that has a MAC address of the first link of the non-STR MLD. In order to allow all terminals to receive and decode frames during the Sub-TXOP, the frames may be transmitted by setting the receiver address to a broadcast address.

The first communication node that is a non-STR MLD may not be able to perform simultaneous frame transmission/reception operations. Accordingly, since the first communication node may not be able to perform a sensing operation for detecting a state of the second link by detecting a reception signal in the second link during the sharing frame transmission through the first link and a preset time period (e.g., SIFS, etc.) (i.e., during the deaf period) for transitioning to a receive mode, the first communication node may not be able to perform a random backoff operation during the deaf period.

The second communication node having received the sharing frame may be a device capable of supporting simultaneous transmission/reception of frames, and thus the second communication node may be able to sense all links in which the second communication node does not transmit frames. Therefore, the second communication node having received the sharing frame may sense the link(s) in which simultaneous transmission(s) indicated by the sharing frame of the first communication node are performed during the deaf period of the first communication node. The second communication node including the AP may identify whether the link (e.g., the second link) is idle as a result of the sensing on the link(s) during the deaf period, and may notify whether the link(s) (e.g., second link) are idle to the first communication node through the link status bitmap and the busy information field of the ACK frame. If the second link is in the idle state during the deaf period, the second communication node including the AP may notify the idle state by setting a bit corresponding to the link in the link status bitmap of the ACK frame to 0. On the other hand, if the second link is in the busy state during the deaf period, the second communication node including the AP may notify information on the length of the busy period of the second link together.

As shown in FIG. 22A, when the second link is in the idle state during the deaf period, the second communication node including the AP, which is capable of supporting simultaneous transmission/reception, may notify that the corresponding link is in the idle state through the ACK frame. The first communication node may receive the link status from the second communication node through the ACK frame, and the second STA of the first communication node may perform a random backoff operation on the second link. On the other hand, the second communication node including the AP may transmit frames to the first STA or the first communication node including the first STA during the Sub-TXOP time after a preset time period (e.g., PIFS or SIFS) after transmitting the ACK frame. The second communication node including the AP may identify the length of the Sub-TXOP to be used for frame transmission based on the information (e.g., sub-TXOP length field) received through the sharing frame. After the Sub-TXOP, the first STA of the non-STR MLD may identify whether the first link is idle by performing sensing, i.e., a link monitoring operation, on the first link during a preset time period (e.g., PIFS or SIFS) before the time of completing the random backoff operation on the second link.

As a result of the link monitoring operation of the first STA of the non-STR MLD, if the first link is in the idle state during the PIFS or SIFS time period, and the second STA of the non-STR MLD completes the random backoff operation on the second link, the first communication node may simultaneously transmit the first PPDU and the second PPDU through the first link and the second link. When the length of the first PPDU and the length of the second PPDU are not equal to each other, the first communication node may add padding to a shorter frame to match the ending times of the frames.

The second communication node including the AP may receive the first PPDU and the second PPDU through the first link and the second link, and after a SIFS time period elapses, the second communication node may receive block ACK request (BAR) frames from the first communication node simultaneously through the first link and the second link. After a SIFS time period elapses after receiving the BAR frame, the first communication node may simultaneously transmit BAs respectively indicating reception states of the first PPDU and the second PPDU through the first link and the second link.

As shown in FIG. 22B, if the second link is occupied by another first communication node during the deaf period, the second communication node including the AP may notify through an ACK frame that the corresponding link is in the busy state. The first communication node may identify the busy state by seeing that the bit of the corresponding link in the link status bitmap of the ACK frame from the second communication node is set to 1, identify how long the corresponding link is occupied through the busy information field received together, and the second STA of the first communication node that is a non-STR MLD may stop the random backoff operation on the second link. The first STA of the first communication node that is a non-STR MLD may perform a link monitoring operation on the first link during a preset time period (e.g., PIFS or SIFS) from the time of receiving the ACK frame.

As a result of the link monitoring operation of the first STA of the first communication node that is a non-STR MLD, if the first link is in the idle state during the PIFS or SIFS time period, the first communication node may transmit a PPDU through the first link. The transmitted PPDU may be a frame including both the first PPDU to be transmitted through the first link and the second PPDU to be transmitted through the second link.

The second communication node including the AP may receive the first PPDU and the second PPDU through the first link, and may transmit a BA indicating the reception states for the first PPDU and the second PPDU through the first link after the SIFS or PIFS time period.

As shown in FIG. 22C, if the second link is in the idle state during the deaf period, the second communication node including the AP may transmit an ACK frame. The first communication node may receive the ACK indicating that the second link is idle from the second communication node including the AP, and the second STA of the first communication node that is a non-STR MLD may perform a random backoff operation on the second link after a SIFS time elapses after receiving the ACK. A random backoff counter used for the random backoff operation may use a counter value obtained by subtracting the deaf period from the initially selected counter value. The second STA of the first communication node that is a non-STR MLD may detect the busy state of the second link during the random backoff operation on the second link. In the case of being occupied by another communication node while performing the backoff procedure, the backoff counter may be frozen. The frozen backoff counter may be used when resuming the channel access. That is, when the first communication node resumes the channel access and performs the channel access on the two links, the first communication node may randomly select only one backoff counter, and may use the previously frozen backoff counter as the other one. On the other hand, the second communication node including the AP may transmit a frame to the first STA or the first communication node including the first STA through the first link during a Sub-TXOP after a preset time period (e.g., PIFS or SIFS) elapses after transmitting the ACK. After the Sub-TXOP, the first STA may perform a link monitoring operation on the first link during a preset time period (e.g., PIFS or SIFS) before the time of completing the random backoff operation on the second link.

As a result of the link monitoring operation of the first STA, if the first link is in the idle state during the PIFS or SIFS time period, the first communication node may transmit the first PPDU through the first link.

The second communication node including the AP may receive the first PPDU through the first link, and may transmit a BA indicating a reception state of the first PPDU through the first link after the SIFS time period.

Figure 23:
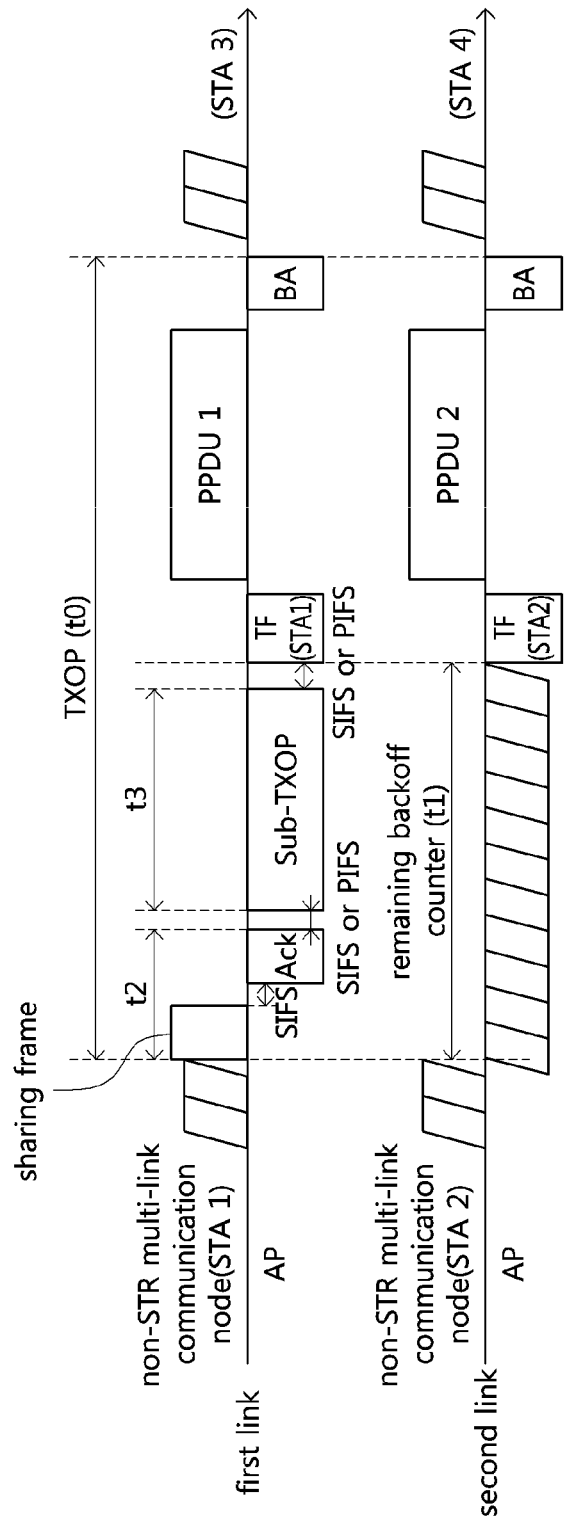
FIG. 23 is a conceptual diagram illustrating a sixth exemplary embodiment of a frame transmission operation through at least one link among a plurality of links as a result of random backoff operations on the plurality of links.

FIG. 23 is a conceptual diagram illustrating a sixth exemplary embodiment of a frame transmission operation through at least one link among a plurality of links as a result of random backoff operations on the plurality of links.

As shown in FIG. 23, a first communication node may transmit frames through a plurality of links (e.g., a first link and a second link). The first communication node of FIG. 23 may be a non-STR MLD that cannot simultaneously perform a frame transmission operation and a frame reception operation. The MLD may use a different MAC address for each link, so that it can operate as if a different first communication node exists for each link although it is a single communication device. For example, an operation of a first MLD having the first link and the second link may be regarded as that a first STA operates on the first link and a second STA operates on the second link.

The first communication node may perform random backoff operations on the links. The first communication node may independently perform the random backoff operation on each of the links. That is, the communication node may perform the random backoff operation on the first link during a first period, and may perform the random backoff operation on the second link during a second period. The first period may be a period having a length different from that of the second period. In order to determine the first period and the second period, the first communication node may select random backoff counter values according to a rule set for each AC according to a type of a frame to be transmitted when performing the random backoff. The first communication node may randomly select two random backoff counters to be applied to the first period and the second period at the same time.

The first communication node (e.g., the first STA) may complete the random backoff operation on one link (e.g., the first link) among the links. The first STA having completed the random backoff operation on the first link may transmit a sharing frame to the second communication node including the AP through the first link. The value of the duration field of the MAC header may be set to (t2−transmission time of the sharing frame+SIFS+ACK frame transmission time).

The first communication node having completed the random backoff operation on one link (e.g., the first link) may stop the random backoff operation on the other link (e.g., the second link) by resetting the random backoff counter in the other link.

The second communication node including the AP may receive the sharing frame from the first communication node (e.g., the first STA). The second communication node including the AP may calculate a transmission period (i.e., Sub-TXOP) of the second communication node based on the parameters of the received sharing frame. The second communication node transmit an ACK frame for the sharing frame to the first communication node (e.g., the first STA) after a preset period (e.g., SIFS) elapses from the time of receiving the sharing frame. After transmitting the ACK frame, the second communication node including the AP may wait for a preset time period (e.g., SIFS or PIFS) in the first link, and then transmit frames to the first communication node including a non-STR MLD through the first link during the Sub-TXOP time period. When the lengths of frames to be transmitted to the first communication nodes are different from each other, the second communication node may add padding to shorter frames according to the ending time of the Sub-TXOP time period to match the ending times of the frames. If there is no payload to be transmitted during the Sub-TXOP time period, the second communication node including the AP may not transmit frames during the Sub-TXOP time period, or may transmit a QoS null frame in which a duration value of a MAC header is set to the Sub-TXOP value.

In addition, the second communication node including the AP may perform a random backoff operation on the second link from the time of receiving the sharing frame. Specifically, the second communication node including the AP may continuously perform the random backoff operation on the second link, that was performed by the first communication node, based on a remaining random backoff counter value of the second link included in the sharing frame. That is, the total random backoff counter performed for the second link may be the random backoff value initially selected by the first communication node. The second communication node including the AP may perform the random backoff operation from the time of receiving the sharing frame, and the random backoff counter value may be set to a value obtained by subtracting the transmission time of the sharing frame from the remaining backoff counter value t1. Accordingly, the second communication node including the AP may perform the random backoff operation during the same time period as the remaining time period of the random backoff operation of the first communication node (e.g., the second STA of the MLD).

After the Sub-TXOP, if the first link is in the idle state during a preset time period (e.g., SIFS or PIFS) from the ending time of the Sub-TXOP, and the second communication node including the AP completes the random backoff operation on the second link, the second communication node may transmit a trigger frame (TF) to the first communication node through the first link and the second link. If the second communication node including the AP fails to complete the random backoff operation by detecting the busy state of the second link during the random backoff operation on the second link, the second communication node may transmit a trigger frame through the first link. The RA of the trigger frame may be set in form of a MAC address. Specifically, the RA of the trigger frame transmitted through the first link may be set to a MAC address of the first STA of the first communication node that is a non-STR MLD, and the RA of the trigger frame transmitted through the second link may be set to a MAC address of the second STA of the first communication node that is a non-STR MLD. The trigger frames may include information on the lengths of transmission frames (or PPDUs) of the first STA and the second STA, respectively.

The first communication node may receive the trigger frames through the first link and the second link. The first STA of the first communication node may transmit a first PPDU through the first link. The second STA of the first communication node may transmit a second PPDU through the second link. The length of the first PPDU and the length of the second PPDU transmitted through the respective links may be indicated by the trigger frames received through the respective links. When the length of the first PPDU and the length of the second PPDU are not equal to each other, the first communication node may add padding to a shorter frame to match the ending times of the frames.

The first communication node receiving the trigger frames through the first link and the second link may simultaneously transmit the first PPDU and the second PPDU through the first link and the second link.

The second communication node including the AP may receive the first PPDU and the second PPDU through the first link and the second link, and after a SIFS time period elapses, the second communication node may simultaneously transmit BAs respectively indicating reception states of the first and second PPDUs through the first link and the second link. The BA may indicate the reception states of all frames included in the first PPDU and the second PPDU. The first communication node may duplicate the BA and transmit the duplicated BAs simultaneously through the first link and the second link.

Figure 24A:
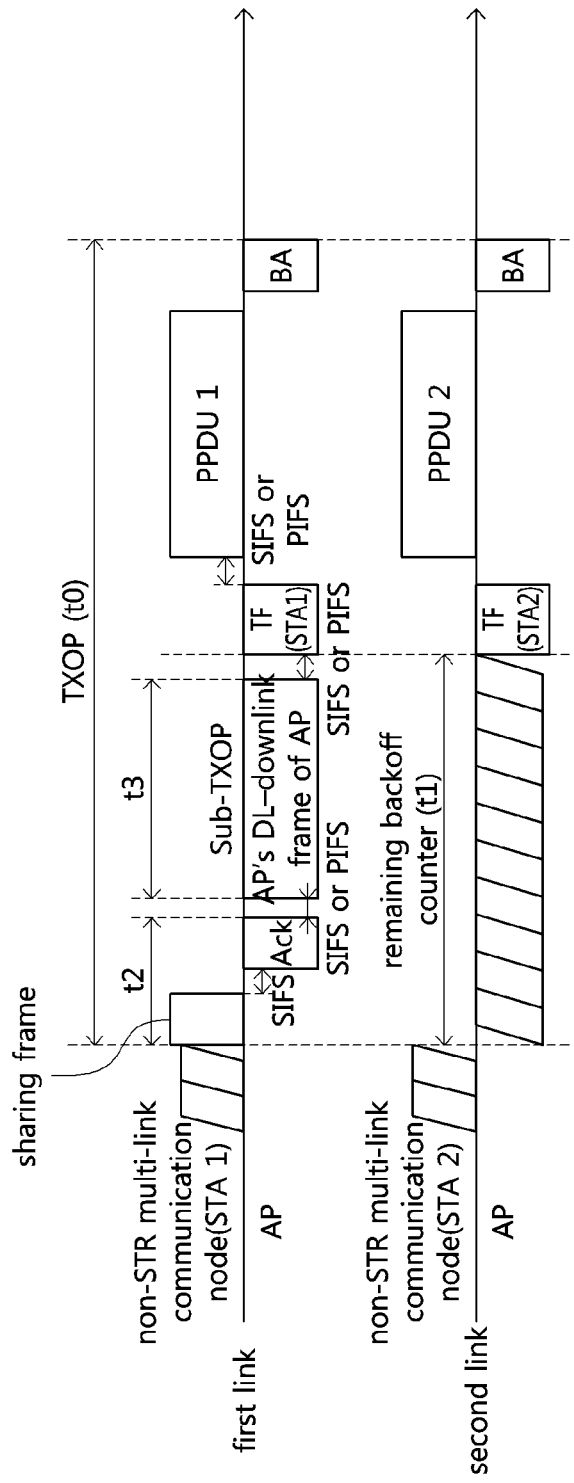
FIG. 24A is a conceptual diagram illustrating a seventh-first exemplary embodiment of a frame transmission operation through at least one link among a plurality of links as a result of random backoff operations on the plurality of links.
Figure 24B:
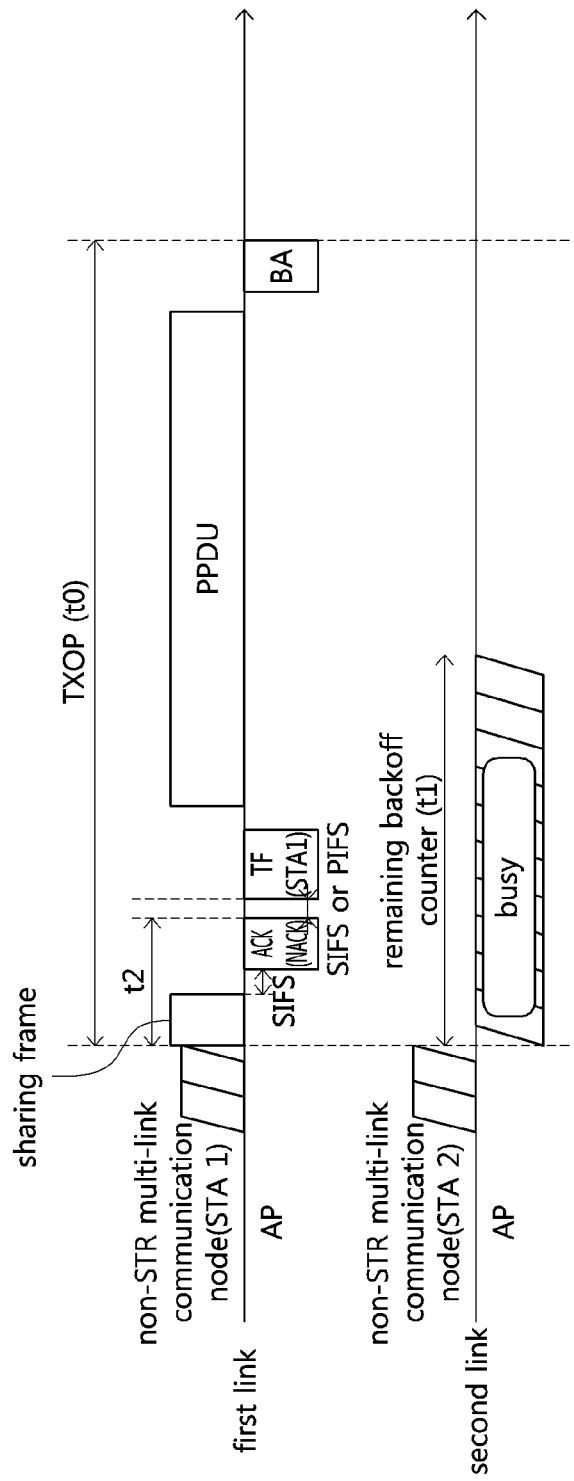
FIG. 24B is a conceptual diagram illustrating a seventh-second exemplary embodiment of a frame transmission operation through at least one link among a plurality of links as a result of random backoff operations on the plurality of links.
Figure 24C:
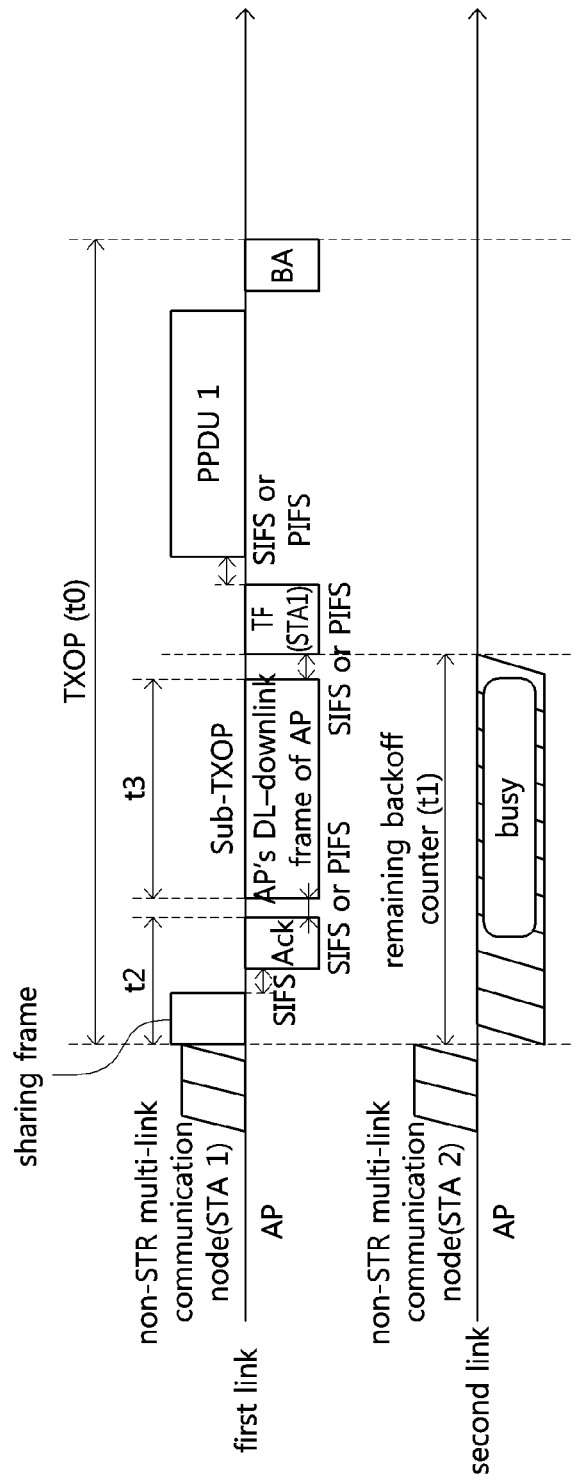
FIG. 24C is a conceptual diagram illustrating a seventh-third exemplary embodiment of a frame transmission operation through at least one link among a plurality of links as a result of random backoff operations on the plurality of links.

FIGS. 24A to 24C are conceptual diagrams illustrating a seventh exemplary embodiment of a frame transmission operation through at least one link among a plurality of links as a result of random backoff operations on the plurality of links.

As shown in FIGS. 24A to 24C, a first communication node may transmit frames through a plurality of links (e.g., a first link and a second link). The first communication node of FIGS. 24A to 24C may be a non-STR MLD that cannot simultaneously perform a frame transmission operation and a frame reception operation. The MLD may use a different MAC address for each link, so that it can operate as if a different first communication node exists for each link although it is a single communication device. For example, an operation of a first MLD having the first link and the second link may be regarded as that a first STA operates on the first link and a second STA operates on the second link.

The first communication node may perform random backoff operations on the links. The first communication node may independently perform the random backoff operation on each of the links. That is, the communication node may perform the random backoff operation on the first link during a first period, and may perform the random backoff operation on the second link during a second period. The first period may be a period having a length different from that of the second period. In order to determine the first period and the second period, the first communication node may select random backoff counter values according to a rule set for each AC according to a type of a frame to be transmitted when performing the random backoff. The first communication node may randomly select two random backoff counters to be applied to the first period and the second period at the same time.

The first communication node (e.g., the first STA) may complete the random backoff operation on one link (e.g., the first link) among the links. The first STA having completed the random backoff operation on the first link may transmit a sharing frame to the second communication node including the AP through the first link. The value of the duration field of the MAC header of the sharing frame may be transmitted as being set to t0 that is a TXOP value used for the entire transmission. The second communication node receiving the sharing frame may configure a TXOP used for the entire transmission based on the sharing frame.

The first communication node may be a non-STR MLD that cannot perform simultaneous frame transmission/reception operations. Therefore, the first communication node may not be able to perform the random backoff operation on the second link during the sharing frame transmission through the first link and a preset time period (e.g., SIFS) (i.e., during the deaf period) required for transitioning to a receive mode. The first communication node having completed the random backoff operation on one link (e.g., the first link) may deliver a remaining random backoff counter of the other link to the second communication including the AP through the sharing frame. The second communication node including the AP may continuously perform the random backoff operation on the second link.

The second communication node including the AP may perform a random backoff operation on the second link from the time of receiving the sharing frame. Specifically, the second communication node may perform the remaining backoff operation on the corresponding link subsequently to the first communication node based on the assigned link bitmap and the random backoff counter value included in the sharing frame. Specifically, in the present exemplary embodiment, the remaining random backoff operation of the first communication node may be continuously performed on the second link. The second communication node including the AP may perform a different random backoff operation if a frame to be transmitted occurs and a random backoff should be performed while performing the random backoff on behalf of the first communication node. When the random backoff for its own frame is successful, the second communication node may stop the random backoff operation performed at the request of the first communication node. The second communication node having received the sharing frame may support simultaneous frame transmission/receptions, and thus may sense all links excluding links through which frames are transmitted by itself. Accordingly, the second communication node including the AP receiving the sharing frame may sense the links with the first communication node during the deaf period of the first communication node. The second communication node may identify whether the link (e.g., the second link) is idle as a result of the link sensing, and transmit information on whether the link (e.g., second link) is idle to the first communication node through an ACK frame. If the second link is in the idle state during the deaf period, the second communication node including the AP may notify the idle state of the second link by setting a bit corresponding to the second link in the link status bitmap of the ACK frame to 0. On the other hand, if the second link is in the busy state during the deaf period, the second communication node including the AP may notify the busy state by setting the bit corresponding to the second link in the link status bitmap of the ACK frame to 1. When notifying the busy state of the second link, the second communication node including the AP may notify information on the length of the busy period of the second link together.

As shown in FIG. 24A, if the second link is in the idle state during the deaf period, the second communication node including the AP may notify that the second link is in the idle state through an ACK frame. The first communication node may receive the ACK frame from the second communication node. After a preset time period (e.g., PIFS or SIFS) elapses from the time of transmitting the ACK frame, the second communication node may transmit a frame(s) to the first communication node(s) during a Sub-TXOP calculated by referring to Sub-TXOP information included in the sharing frame. The second communication node performing transmissions to a plurality of first communication nodes may perform multi-user transmission by using an orthogonal frequency division multiple access (OFDMA) scheme. A MAC frame transmitted by the second communication node including the AP may be a trigger frame, and an RA of the trigger frame may be a broadcast address. The second communication node may sense the second link for a backoff operation performed subsequently from the first communication node on the second link, and sense the first link during a preset time period (e.g., PIFS or SIFS) after the Sub-TXOP. If the second communication node including the AP completes the random backoff operation on the second link, and the first link is in the idle state during a PIFS or SIFS, which is the preset period, the second communication node including the AP may transmit a trigger frame to the first communication node through each of the first link and the second link. The RA of the trigger frame may be set in form of a MAC address. Specifically, the RA of the trigger frame transmitted through the first link may be set to a MAC address of the first STA of the first communication node that is a non-STR MLD, and the RA of the trigger frame transmitted through the second link may be set to a MAC address of the second STA of the first communication node that is a non-STR MLD. The trigger frames may include information on lengths of the transmission frames (or PPDUs) of the first STA or the second STA, respectively.

The first communication node may receive the trigger frames through the first link and the second link. The first STA of the first communication node may transmit a first PPDU through the first link. The second STA of the first communication node may transmit a second PPDU through the second link.

The second communication node including the AP may receive the first PPDU and the second PPDU through the first link and the second link, and after a SIFS time period, the second communication node may simultaneously transmit BAs respectively indicating reception states of the first PPDU and the second PPDU through the first link and the second link.

Referring to FIG. 24B, if the second link is in the busy state during the deaf period, that is, if the second communication node including the AP occupies the second link before transmitting the ACK frame, the second communication may notify the busy state by setting a bit corresponding to the occupied link in the link status bitmap of the ACK frame to 1. When the second communication node including the AP notifies the busy state, information on the length of the busy period may be notified through the busy information field together with the busy state.

The first link may be monitored during a preset time period (e.g., PIFS or SIFS) from the time of transmitting the ACK frame, and if the first link is in the idle state during the preset time period, the second communication node including the AP may transmit a trigger frame to the first communication node through the first link. The RA of the trigger frame may be set to a MAC address of the first STA of the first communication node. The trigger frame may include information on a length of the frame (or PPDU) transmitted by the first STA of the first communication node. Similarly, in the case of receiving the trigger frame without being notified of the busy state through the ACK frame, the first communication node may determine that the second link is busy, and thus may transmit the frame only through the first link.

The first communication node may receive the trigger frame through the first link. The first STA of the first communication node may transmit a PPDU including all data to be transmitted through the first link and the second link.

The second communication node including the AP may receive the PPDU through the first link, and may transmit a BA indicating a reception state of the received PPDU through the first link after a SIFS time period.

As shown in FIG. 24C, if the second link is in the idle state during the deaf period, the second communication node including the AP may transmit an ACK frame including information indicating that the second link is in the idle state. The first communication node may receive the ACK frame from the second communication node including the AP. The second communication node including the AP may detect a busy state of the second link during a random backoff operation on the second link. After a preset time period (e.g., PIFS or SIFS) elapses from the time of transmitting the ACK, the second communication node including the AP may transmit a frame to the first communication node(s) during a Sub-TXOP period. After the Sub-TXOP, the second communication node including the AP may monitor the first link during a preset time period (e.g., PIFS or SIFS), and if the first link is in the idle state during the preset time period, the second communication node including the AP may transmit a trigger frame to the first communication node through the first link. The RA of the trigger frame may be set to a MAC address of the first STA of the first communication node. The trigger frame may including information on a length of a transmission frame (or PPDU) that the first STA of the first communication node can transmit through the first link.

The first communication node may receive the trigger frame through the first link. The first STA of the first communication node may transmit a PPDU including data to be included in the first PPDU and the second PPDU in the first link.

The second communication node including the AP may receive the PPDU through the first link, and may transmit a BA indicating a reception state of the PPDU through the first link after a SIFS time period.

Figure 25:
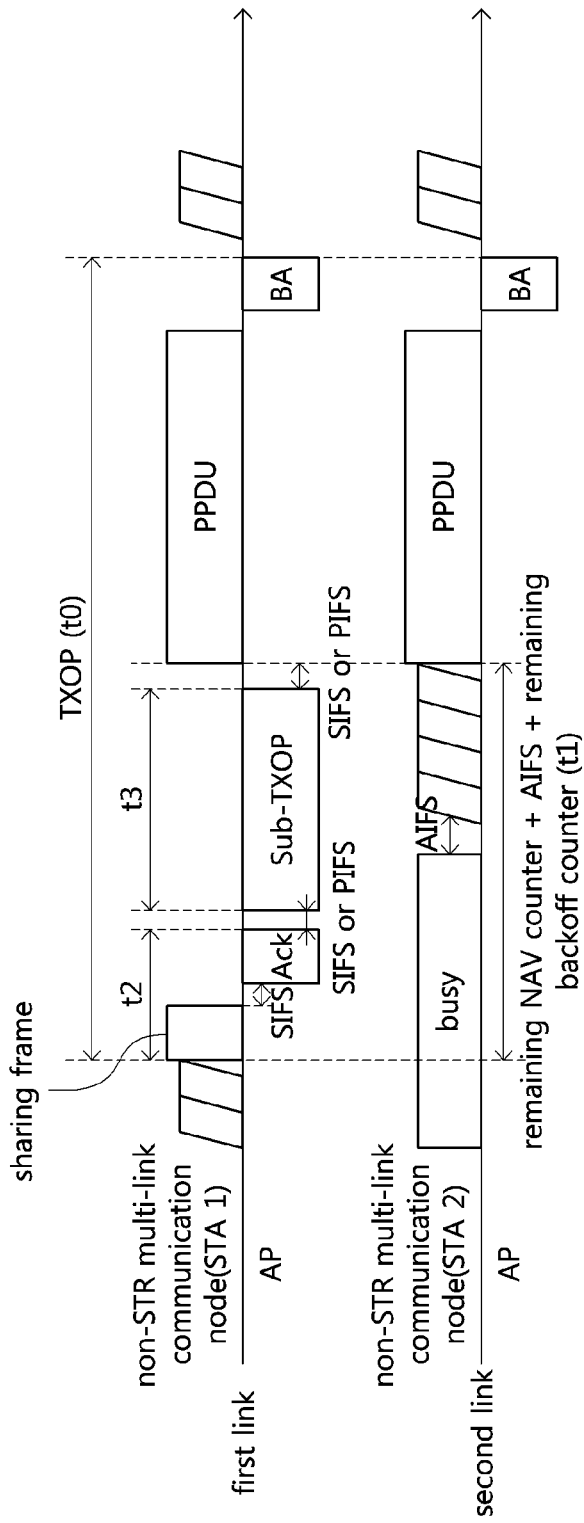
FIG. 25 is a conceptual diagram illustrating an eighth exemplary embodiment of a frame transmission operation through at least one link among a plurality of links as a result of random backoff operations on the plurality of links.

FIG. 25 is a conceptual diagram illustrating an eighth exemplary embodiment of a frame transmission operation through at least one link among a plurality of links as a result of random backoff operations on the plurality of links.

As shown in FIG. 25, a first communication node may transmit frames through a plurality of links (e.g., a first link and a second link). The first communication node of FIG. 25 may be a non-STR MLD that cannot simultaneously perform a frame transmission operation and a frame reception operation. The MLD may use a different MAC address for each link, so that it can operate as if a different first communication node exists for each link although it is a single communication device. For example, an operation of a first MLD having the first link and the second link may be regarded as that a first STA operates on the first link and a second STA operates on the second link.

The first communication node may perform random backoff operations on the links. The first communication node may independently perform the random backoff operation on each of the links. The first communication node may detect a busy state of the second link before completing the random backoff operation on the first link. The first communication node (e.g., the second STA) may perform a packet decoding (PD) operation and an ED operation to obtain information on an ending time of the busy state. The second STA of the first communication node having obtained the information on the ending time of the busy state of the second link may set a NAV, and stop the random backoff operation.

If the information on the ending time of the busy state of the second link can be obtained before transmission of a sharing frame through the first link, t1 informed through the sharing frame may be set to <remaining NAV counter+ AIFS+remaining backoff counter>.

The first STA of the first communication node having completed the random backoff operation on the first link may transmit the sharing frame to the second communication node including the AP through the first link. The second communication node may receive the sharing frame from the first communication node (e.g., the first STA). The second communication node may calculate a transmission period (Sub-TXOP) of the second communication node based on the parameters of the received sharing frame. The second communication node may transmit an ACK frame for the sharing frame to the first communication node (e.g., the first STA) after a preset period (e.g., SIFS) elapses from the time of receiving the sharing frame.

The second communication node having transmitted the ACK frame may wait for a preset time period (e.g., SIFS or PIFS) for ED or PD sensing on the first link, and then transmit a frame through the first link during the Sub-TXOP time period.

After the Sub-TXOP, the first STA of the first communication node may perform a link monitoring operation on the first link during a preset time period (e.g., PIFS or SIFS). For example, the first STA of the first communication node may perform an ED or PD operation to detect a frame from another first communication node.

After the busy state of the second link ends, the second STA of the first communication node may monitor the second link during a preset time period (e.g., AIFS). If the second link is in the idle state during the preset time period (e.g., AIFS), the second STA of the first communication node may perform a random backoff operation on the second link.

As a result of the link monitoring operation of the first STA of the first communication node, if the first link is in the idle state during a PIFS time period and the second STA of the first communication node completes the random backoff operation on the second link, the first communication node may simultaneously transmit the first PPDU and the second PPDU through the first link and the second link.

The second communication node including the AP may receive the first PPDU and the second PPDU through the first link and the second link, and after a SIFS time period, the second communication node may simultaneously transmit BAs respectively indicating reception states of the first PPDU and the second PPDU through the first link and the second link. The BA may indicate reception states of all frames included in the first PPDU and the second PPDU.

The first communication node may duplicate the BA and transmit the duplicated BAs simultaneously through the first link and the second link.

Figure 26A:
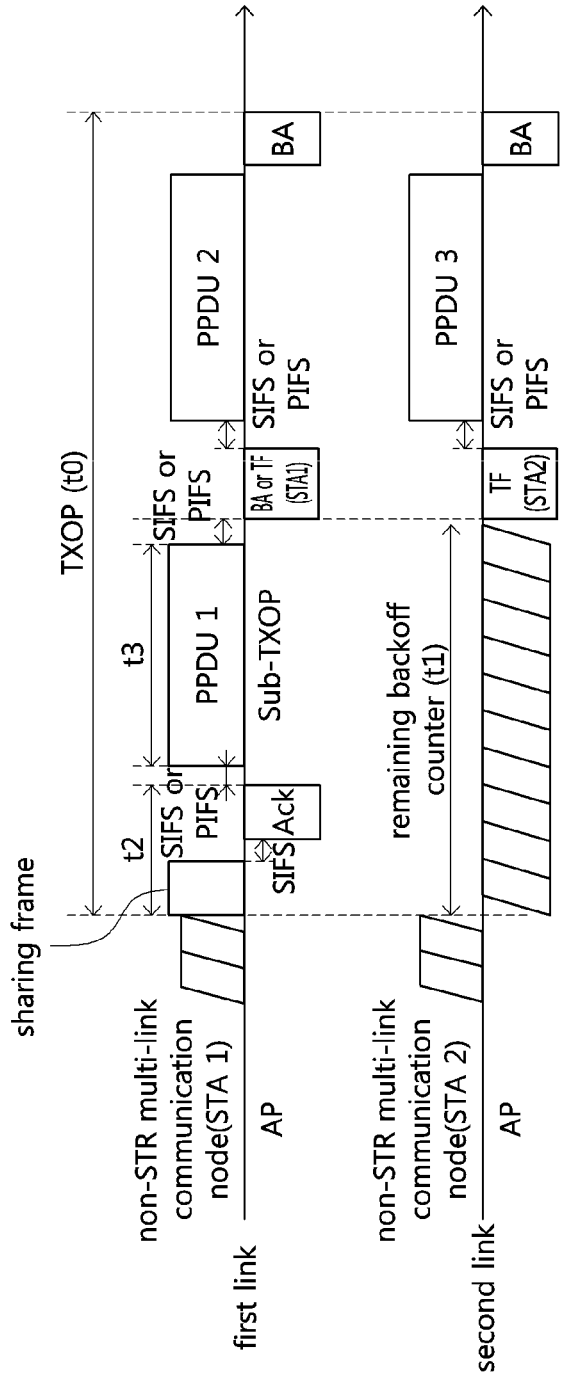
FIG. 26A is a conceptual diagram illustrating a ninth-first exemplary embodiment of a frame transmission operation through at least one link among a plurality of links as a result of random backoff operations on the plurality of links.
Figure 26B:
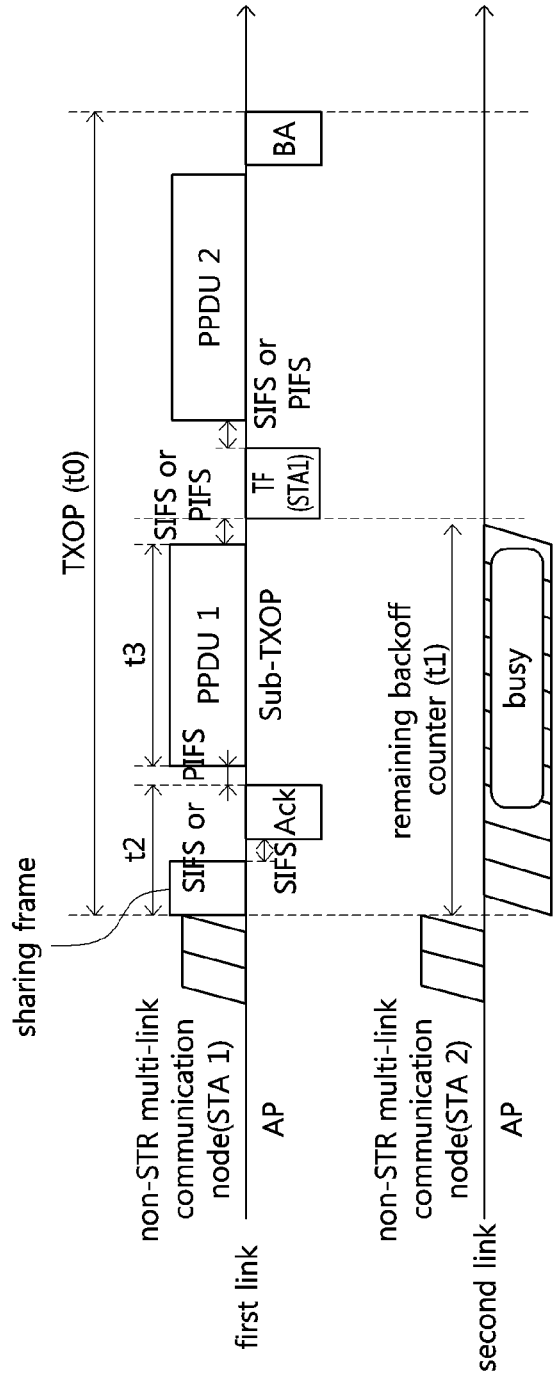
FIG. 26B is a conceptual diagram illustrating a ninth-second exemplary embodiment of a frame transmission operation through at least one link among a plurality of links as a result of random backoff operations on the plurality of links.

FIGS. 26A to 26B are conceptual diagrams illustrating a ninth exemplary embodiment of a frame transmission operation through at least one link among a plurality of links as a result of random backoff operations on the plurality of links.

As shown in FIGS. 26A to 26B, a first communication node may transmit frames through a plurality of links (e.g., a first link and a second link). The first communication node of FIGS. 26A to 26B may be a non-STR MLD that cannot simultaneously perform a frame transmission operation and a frame reception operation. The MLD may use a different MAC address for each link, so that it can operate as if a different first communication node exists for each link although it is a single communication device. For example, an operation of a first MLD having the first link and the second link may be regarded as that a first STA operates on the first link and a second STA operates on the second link.

The first communication node may perform random backoff operations on the links. The first communication node may independently perform the random backoff operation on each of the links. That is, the communication node may perform the random backoff operation on the first link during a first period, and may perform the random backoff operation on the second link during a second period. The first period may be a period having a length different from that of the second period. In order to determine the first period and the second period, the first communication node may select random backoff counter values according to a rule set for each AC according to a type of a frame to be transmitted when performing the random backoff. The first communication node may randomly select two random backoff counters to be applied to the first period and the second period at the same time.

The first communication node (e.g., the first STA) may complete the random backoff operation on one link (e.g., the first link) among the links. The first STA of the first communication node having completed the random backoff operation on the first link may transmit a sharing frame to the second communication node including the AP through the first link. The value of the duration field of the MAC header of the sharing frame may be transmitted as being set to t0 that is a TXOP value used for the entire transmission. The second communication node receiving the sharing frame may configure a TXOP used for the entire transmission based on the sharing frame. When the first communication node intends to transmit a PPDU during the Sub-TXOP, the first communication node may transmit the sharing frame by setting a Sub-TXOP length field included in the sharing frame to 0.

The first communication node having completed the random backoff operation on one link (e.g., the first link) may stop the random backoff operation on the other link (e.g., the second link) by resetting the random backoff counter in the other link.

The second communication node including the AP may receive the sharing frame from the first communication node (e.g., the first STA). The second communication node including the AP may calculate a transmission period (i.e., Sub-TXOP) of the second communication node based on the Sub-TXOP length field of the received sharing frame. The second communication node receiving the sharing frame in which the value of the Sub-TXOP length field is set to 0 may give a transmission opportunity to the first communication node, and may not transmit a separate PPDU during the Sub-TXOP period. The second communication node may transmit an ACK frame for the sharing frame to the first communication node (e.g., the first STA) after a preset period (e.g., SIFS) elapses from the time of receiving the sharing frame.

The first communication node having transmitted the sharing frame by setting the Sub-TXOP length field of the sharing frame to 0 may receive the ACK frame from the second communication node including the AP. After waiting for a preset time period (e.g., SIFS or PIFS) in the first link from the time of receiving the ACK frame, the first communication node may transmit a first PPDU through the first link during the Sub-TXOP time period. The first PPDU may be a PPDU to the second communication node including the AP. The first communication node may not transmit a frame during the Sub-TXOP time period, or may transmit a QoS null frame in which a duration value of a MAC header is set to the Sub-TXOP value.

In addition, the second communication node including the AP may perform a random backoff operation on the second link from the time of receiving the sharing frame. Specifically, the second communication node may perform a remaining random backoff operation based on link assignment information and a remaining random backoff counter value included in the sharing frame. Specifically, in the present exemplary embodiment, the remaining random backoff operation of the first communication node may be continuously performed on the second link. The second communication node including the AP may perform a different random backoff operation if a frame to be transmitted occurs and a random backoff should be performed while performing the random backoff on behalf of the first communication node. When the random backoff for its own frame is successful, the second communication node may stop the random backoff operation performed at the request of the first communication node. The second communication node including the AP may perform the random backoff operation from the time of receiving the sharing frame, and the random backoff counter value used for the random backoff operation may be set to a value obtained by subtracting the transmission time of the sharing frame from t1 which is the remaining backoff counter value. Accordingly, the second communication node including the AP may perform the random backoff operation during the same time period as the random backoff operation time period of the first communication node (e.g., the second STA).

As shown in FIG. 26A, the first communication node may transmit the first PPDU during the Sub-TXOP period. After the Sub-TXOP, if the first link is in the idle state during a preset time period (e.g., SIFS or PIFS) from the ending time of the Sub-TXOP, and the second communication node including the AP completes the random backoff operation on the second link, the second communication node including the AP may transmit trigger frames to the first communication node through the first link and the second link. The RA of the trigger frame may be set in form of a MAC address. Specifically, the RA of the trigger frame transmitted through the first link may be set to a MAC address of the first STA of the first communication node that is a non-STR MLD, and the RA of the trigger frame transmitted through the second link may be set to a MAC address of the second STA of the first communication node that is a non-STR MLD. The trigger frames may set length information of transmission frames (or PPDUs) of the first STA and the second STA, respectively.

The second communication node including the AP may transmit, to the first communication node, a BA for the frame received through the first link during the Sub-TXOP time period together with the trigger frame transmitted through the first link, and transmit only the trigger frame through the second link. The transmission length of (BA+trigger frame) of the first link and the transmission length of the trigger frame of the second link may be the same. Accordingly, the first communication node may add padding to the trigger frame of the second link to match the length of the trigger frame of the second link to the length of the (BA+trigger frame) of the first link. Alternatively, the second communication node including the AP may deliver the BA for the first PPDU transmitted during the Sub-TXOP period later, and in this case, only the trigger frame may be transmitted also through the first link.

The first communication node may receive the trigger frames (or ACK) through the first link and the second link. The first STA of the first communication node may transmit the second PPDU through the first link. The second STA of the first communication node may transmit the third PPDU through the second link. The length of the second PPDU and the length of the third PPDU may be indicated by the trigger frame. When the length of the second PPDU and the length of the third PPDU are not equal to each other, the first communication node may add padding to a shorter frame to match the ending times of the frames.

The first communication node receiving the trigger frames through the first link and the second link may simultaneously transmit the second PPDU and the third PPDU through the first link and the second link.

The second communication node including the AP may receive the second PPDU and the third PPDU through the first link and the second link, and after a SIFS time period, the second communication node may simultaneously transmit BAs respectively indicating reception states of the second and third PPDUs through the first link and the second link.

As shown in FIG. 26B, the second communication node including the AP may detect a busy state of the second link during the random backoff operation on the second link, and the second communication node may stop the random backoff operation on the second link. After the Sub-TXOP, if the first link is in the idle state during a preset time period (e.g., SIFS or PIFS) from the ending time of the Sub-TXOP, and the second communication node stops the random backoff operation on the second link, the second communication node may transmit a trigger frame to the first communication node only through the first link. The RA of the trigger frame may be set to a MAC address of the first STA of the first communication node. The trigger frame may set length information of the transmission frame (or PPDU) of the first STA of the first communication node. Alternatively, the second communication node may transmit a BA indicating the reception state of the frame received through the first link during the Sub-TXOP time period to the first communication node together with the trigger frame.

The first communication node may receive the trigger frame (and BA) through the first link. The first STA of the first communication node may transmit the second PPDU through the first link. The length of the second PPDU may be indicated by the trigger frame. The first communication node receiving the trigger frame through the first link may transmit the second PPDU through the first link.

The second communication node including the AP may receive the second PPDU through the first link, and may transmit a BA indicating the reception state of the second PPDU through the first link after a SIFS time period.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a communication node in a wireless communication network, the operation method comprising:
    selecting a first random backoff counter value for a first random backoff operation, and selecting a second random backoff counter value for a second random backoff operation;
    performing the first random backoff operation on a first link during a first period according to the first random backoff counter value, and performing the second random backoff operation on a second link during a second period according to the second random backoff counter value;
    in response to determining not to transmit a first frame based on a remaining counter value of the second random backoff operation being less than a threshold when the first random backoff operation is completed, performing a monitoring operation on the first link while performing the second random backoff operation; and
    in response to determining that the first link is in an idle state as a result of the monitoring operation, and that the second random backoff operation is completed, transmitting the first frame on the first link and a second frame on the second link, respectively, from a completion time point of the second random backoff operation.

2. The operation method according to claim 1, wherein the first period and the second period have different durations.

3. The operation method according to claim 2, wherein the first period is determined based on an access category corresponding to the first frame, and the second period is determined based on an access category corresponding to the second frame.

4. The operation method according to claim 1, wherein each of the first frame and the second frame is a physical layer protocol data unit (PPDU).

5. The operation method according to claim 1, wherein padding bit(s) are added to at least one of the first frame and the second frame so that the first frame and the second frame have a same duration.

6. The operation method according to claim 1, wherein the transmission of the first frame and the transmission of the second frame are started simultaneously at the completion time point.

7. The operation method according to claim 1, wherein the communication node is a non-simultaneous transmit and receive (non-STR) multi-link device (MLD), and the communication node uses different medium access control (MAC) layer addresses for the first link and the second link.

8. An operation method of a communication node in a wireless communication network, the operation method comprising:
  selecting a first random backoff counter value for a first random backoff operation, and selecting a second random backoff counter value for a second random backoff operation;
  performing the first random backoff operation on a first channel during a first period according to the first random backoff counter value, and performing the second random backoff operation on a second channel during a second period according to the second random backoff counter value;
  in response to determining not to transmit a first frame based on a remaining counter value of the second random backoff operation being less than a threshold when the first random backoff operation is completed, performing a monitoring operation on the first channel while performing the second random backoff operation; and
  in response to determining that the first channel is in an idle state as a result of the monitoring operation, and that the second random backoff operation is completed, transmitting the first frame on the first channel and a second frame on the second channel, respectively, from a completion time point of the second random backoff operation.

9. The operation method according to claim 8, wherein the first period and the second period have different durations.

10. The operation method according to claim 8, wherein the first period is determined based on an access category corresponding to the first frame, and the second period is determined based on an access category corresponding to the second frame.

11. The operation method according to claim 8, wherein each of the first frame and the second frame is a physical layer protocol data unit (PPDU).

12. The operation method according to claim 8, wherein padding bit(s) are added to at least one of the first frame and the second frame so that the first frame and the second frame have a same duration.

13. The operation method according to claim 8, wherein the transmission of the first frame and the transmission of the second frame are started simultaneously at the completion time point.

14. A communication node in a wireless communication network, the communication node comprising:
  at least one processor;
  a transceiver controlled by the at least one processor; and
  a memory storing instructions,
  wherein when executed by the at least one processor, the instructions cause the communication node to:
    select a first random backoff counter value for a first random backoff operation, and select a second random backoff counter value for a second random backoff operation;
    perform, by using the transceiver, the first random backoff operation on a first link during a first period according to the first random backoff counter value, and perform, by using the transceiver, the second random backoff operation on a second link during a second period according to the second random backoff counter value;
    in response to determining not to transmit a first frame based on a remaining counter value of the second random backoff operation being less than a threshold when the first random backoff operation is completed, perform, by using the transceiver, a monitoring operation on the first link while performing the second random backoff operation; and
    in response to determining that the first link is in an idle state as a result of the monitoring operation, and that the second random backoff operation is completed, transmit, by using the transceiver, the first frame on the first link and a second frame on the second link, respectively, from a completion time point of the second random backoff operation.

15. The communication node according to claim 14, wherein the first period and the second period have different durations.

16. The communication node according to claim 15, wherein the first period is determined based on an access category corresponding to the first frame, and the second period is determined based on an access category corresponding to the second frame.

17. The communication node according to claim 14, wherein each of the first frame and the second frame is a physical layer protocol data unit (PPDU).

18. The communication node according to claim 14, wherein padding bit(s) are added to at least one of the first frame and the second frame so that the first frame and the second frame have a same duration.

19. The communication node according to claim 14, wherein the transmission of the first frame and the transmission of the second frame are started simultaneously at the completion time point.

20. The communication node according to claim 14, wherein the communication node is a non-simultaneous transmit and receive (non-STR) multi-link device (MLD), and the communication node uses different medium access control (MAC) layer addresses for the first link and the second link.

* * * * *